United States Patent
Sundberg et al.

(10) Patent No.: US 11,356,310 B2
(45) Date of Patent: Jun. 7, 2022

(54) SYSTEMS AND METHODS FOR MINIMIZING PERFORMANCE IMPACT FROM KNOWN SIGNAL DISTORTIONS

(71) Applicant: Telefonaktiebolaget LM Ericsson (publ), Stockholm (SE)

(72) Inventors: Mårten Sundberg, Årsta (SE); Daniel Chen Larsson, Lund (SE); Miguel Lopez, Solna (SE); Yi-Pin Eric Wang, Fremont, CA (US); Gustav Wikström, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 552 days.

(21) Appl. No.: 16/332,584

(22) PCT Filed: Feb. 2, 2018

(86) PCT No.: PCT/EP2018/052706
§ 371 (c)(1),
(2) Date: Mar. 12, 2019

(87) PCT Pub. No.: WO2018/141932
PCT Pub. Date: Aug. 9, 2018

(65) Prior Publication Data
US 2021/0288853 A1 Sep. 16, 2021

Related U.S. Application Data

(60) Provisional application No. 62/455,298, filed on Feb. 6, 2017.

(51) Int. Cl.
*H04L 27/26* (2006.01)
*H04L 1/08* (2006.01)
(Continued)

(52) U.S. Cl.
CPC ............ *H04L 27/2613* (2013.01); *H04L 1/08* (2013.01); *H04L 5/0048* (2013.01); *H04W 72/0446* (2013.01)

(58) Field of Classification Search
CPC ..... H04L 27/2613; H04L 1/08; H04L 5/0048; H04W 72/0446
See application file for complete search history.

(56) References Cited

U.S. PATENT DOCUMENTS

| | | | |
|---|---|---|---|
| 6,711,221 B1* | 3/2004 | Belotserkovsky | .. H04L 27/2662 375/355 |
| 2012/0157104 A1* | 6/2012 | Verzegnassi | .......... H04L 25/061 455/437 |

(Continued)

OTHER PUBLICATIONS

On the Impact of Transient Period for Short Transmission Duration by Marten Sundberg et al., Ericsson Development Unit Networks, Ericsson AB, Sweden—IEEE 2017.

(Continued)

*Primary Examiner* — Michael Thier
*Assistant Examiner* — Nevena Zecevic Sandhu
(74) *Attorney, Agent, or Firm* — Christopher & Weisberg, P.A.

(57) ABSTRACT

According to certain embodiments, a method in a wireless device includes generating a signal comprising repeating segments for transmission in a subslot duration transmission time interval (TTI) to a network node. The signal comprising the repeating segments is transmitted to the network node in the subslot duration TTI.

20 Claims, 23 Drawing Sheets

(51) Int. Cl.
  *H04L 5/00* (2006.01)
  *H04W 72/04* (2009.01)

(56) References Cited

U.S. PATENT DOCUMENTS

| | | | |
|---|---|---|---|
| 2012/0269286 A1* | 10/2012 | Huang | H04L 25/0248 375/295 |
| 2015/0326279 A1* | 11/2015 | Schneider | H04L 27/2626 375/257 |
| 2016/0218788 A1* | 7/2016 | Yum | H04B 7/0626 |
| 2017/0013618 A1* | 1/2017 | Shin | H04L 5/001 |

OTHER PUBLICATIONS

3GPP TSG-RAN WG1 #87; Reno, USA; Source: Ericsson; Title: Design aspects of sPUSCH (R1-1611522)—Nov. 14-18, 2016.
3GPP TSG RAN WG1 Meeting #86bis; Lisbon, Portugal; Source: Huawei, HiSilicon; Title: Discussion on UL RS for short TTI (R1-1608641)—Oct. 10-14, 2016.
PCT International Search Report for International application No. PCT/EP2018/052706—dated Apr. 24, 2018.

\* cited by examiner

SYSTEMS AND METHODS FOR MINIMIZING PERFORMANCE IMPACT FROM KNOWN SIGNAL DISTORTIONS

PRIORITY

This nonprovisional application is a U.S. National Stage Filing under 35 U.S.C. § 371 of International Patent Application Serial No. PCT/EP2018/052706 filed Feb. 2, 2018 and entitled "Systems and Methods For Minimizing Performance Impact From Known Signal Distortions" which claims priority to U.S. Provisional Patent Application No. 62/455,298 filed Feb. 6, 2017 both of which are hereby incorporated by reference in their entirety.

TECHNICAL FIELD

The present disclosure relates, in general, to wireless communications and, more particularly, systems and methods for minimizing performance impact from known signal distortions.

BACKGROUND

In 3GPP Long Term Evolution (LTE) systems, data transmissions in both downlink are organized into radio frames of 10 ms. A downlink transmission may include a transmission from a network node, which may be referred to as an eNodeB (eNB) to a wireless device, which may be referred to as a user equipment (UE). Conversely, an uplink transmission may include a transmission from a wireless device, or UE, to a network node, or eNB. Each radio frame consists of ten equally-sized subframes of length $T_{subframe}=1$ ms. FIG. 1 illustrates such an exemplary LTE time-domain structure.

FIG. 2 illustrates the basic LTE downlink physical resource. LTE uses Orthogonal Frequency Division Multiplexing (OFDM) in the downlink and Discrete Fourier Transform (DFT)-spread OFDM in the uplink. The basic LTE downlink physical resource can thus be seen as a time-frequency grid, where each resource element (or time/frequency resource element (TFRE)) corresponds to one OFDM subcarrier during one OFDM symbol interval.

The resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

FIG. 3 illustrates an LTE uplink resource grid. As illustrated in FIG. 3, $N_{RB}^{UL}$ is the number of resource blocks (RBs) contained in the uplink system bandwidth, $N_{sc}^{RB}$ is the number subcarriers in each RB, typically $N_{sc}^{RB}=12$, $N_{symb}^{UL}$ is the number of SC-FDMA symbols in each slot. $N_{symb}^{UL}=7$ for normal cyclic prefix (CP) and $N_{symb}^{UL}=6$ for extended CP. A subcarrier and a SC-FDMA symbol form an uplink resource element (RE).

Downlink transmissions are dynamically scheduled. For example, in each subframe, the base station may transmit control information about to which terminals data is transmitted and upon which resource blocks the data is transmitted in the current downlink subframe. This control signaling is typically transmitted in the first 1, 2, 3 or 4 OFDM symbols in each subframe in LTE and 1 or 2 OFDM symbols in NR. A downlink system with 3 OFDM symbols as control is illustrated in FIG. 4.

Transmissions in the uplink (from a UE to an eNB) are, as in the downlink, also dynamically scheduled through the downlink control channel. When a UE receives uplink grant in subframe n, it transmits data in the uplink at subframe n+k, where k=4 for FDD system and k varies for TDD systems.

In LTE, a number of physical channels are supported for data transmissions. A downlink or an uplink physical channel corresponds to a set of resource elements carrying information originating from higher layers, while a downlink or an uplink physical signal is used by the physical layer but does not carry information originating from higher layers. Some of the downlink physical channels and signals supported in LTE are:

Physical Downlink Shared Channel, PDSCH
Physical Downlink Control Channel, PDCCH
Enhanced Physical Downlink Control Channel, EPDCCH
Reference signals:
    Cell Specific Reference Signals (CRS)
    DeModulation Reference Signal (DMRS) for PDSCH
    Channel State Information Reference Signals (CSI-RS)

PDSCH is used mainly for carrying user traffic data and higher layer messages in the downlink and is transmitted in a DL subframe outside of the control region as shown in FIG. 4. Both PDCCH and EPDCCH are used to carry Downlink Control Information (DCI) such as PRB allocation, modulation level and coding scheme (MCS), precoder used at the transmitter, etc. PDCCH is transmitted in the first one to four OFDM symbols in a DL subframe, i.e. the control region, while EPDCCH is transmitted in the same region as PDSCH.

Some of the uplink physical channels and signals supported in LTE are:

Physical Uplink Shared Channel, PUSCH
Physical Uplink Control Channel, PUCCH
DeModulation Reference Signal (DMRS) for PUSCH
DeModulation Reference Signal (DMRS) for PUCCH The PUSCH is used to carry uplink data or/and uplink control information from the UE to the eNodeB. The PUCCH is used to carry uplink control information from the UE to the eNodeB.

LTE Uplink Modulation

As discussed above, the uplink modulation (SC-FDMA) is different from the downlink modulation (OFDMA). The main reason for this is to minimize the cubic metric/Peak-to-Average-Power-Ratio (PAPR) of the uplink signal. With a lower PAPR the UE power amplifiers (PAs) can work at a higher average power level, and operate with higher efficiency.

This design choice implies however some rather severe restrictions on the system design:

1. The allocation of resources to a UE must be made so that the signal does not show multi-carrier properties, i.e. a signal with a high PAPR. This is ensured by allocating the RBs contiguously in frequency prior to applying the FFT-precoder.
2. The reference symbols need to be transmitted on a separate OFDM symbol to be able to perform proper synchronization and channel estimation. It can be noted that in LTE, the reference symbols are not modulated with SC-OFDMA but using OFDMA modulated reference signals (either computer generated signals that after OFDMA modulation has low PAPR properties or using a Zadoff-Zhu sequence).

Latency Reduction with Short TTI

Packet data latency is one of the performance metrics that vendors, operators, and end-users (via speed test applications) regularly measures. Latency measurements are done in all phases of a radio access network system lifetime, when verifying a new software release or system component, when deploying a system and when the system is in commercial operation.

Shorter latency than previous generations of 3GPP RATs was one performance metric that guided the design of Long Term Evolution (LTE). The end-users also now recognize LTE to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. According to HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. As a result, improved latency can rather easily be showed to improve the average throughput, for this type of TCP based data transactions.

Latency reductions may positively impact radio resource efficiency. Lower packet data latency could increase the number of transmissions possible within a certain delay bound; hence higher Block Error Rate (BLER) targets could be used for the data transmissions freeing up radio resources potentially improving the capacity of the system.

One approach to latency reduction is the reduction of transport time of data and control signaling, by addressing the length of a transmission time interval (TTI). By reducing the length of a TTI and maintaining the bandwidth, the processing time at the transmitter and the receiver nodes is also expected to be reduced, due to less data to process within the TTI. As described above with regard to FIG. 1, in LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. In LTE release 14 in 3GPP, a study item on latency reduction has been conducted, with the goal of specifying transmissions with shorter TTIs, such as a slot or a few symbols. Specifying short TTI (sTTI) may, thus, be a goal.

A sTTI can be decided to have any duration in time and comprise resources on any number of OFDM or SC-FDMA symbols, and start at symbol position within the overall frame. For the work in LTE the focus of the work currently is to only allow the sTTIs to start at fixed positions with durations of 2, 3, 4 or 7 symbols. Furthermore, the sTTI is not allowed to cross neither slot nor subframe boundaries.

FIG. 5 illustrates an example of a 2/3-symbol sTTI configuration within an uplink subframe. As depicted, the duration of the uplink short TTI is 0.5 ms and, thus, seven SC-FDMA symbols for the case with normal cyclic prefix. Also a combined length of 2 or 3 symbols are shown for the sTTI. As shown here, the "R" indicates the DMRS symbols, and "D" indicates the data symbols. Other configurations are not excluded, and FIG. 5 is only one example for depicting differences in sTTI lengths.

Reference Signals

As mentioned above, for LTE, there are various reference signals with different purposes. Examples of various reference signals may include cell-specific reference signals (CRS), demodulation reference signals (DMRS), and channel state information reference signals (CSI-RS). Reference signals may also be referred to as pilot symbols, training sequence, synchronization sequence, pre-amble, mid-amble, and for the purpose of this invention, the names can be used inter-changeably.

The reference signals can be designed in different ways aiming at fulfilling different purposes, but in general terms, a reference signal is typically used to estimate one or more parameters required for network operation. Typically, it is of interest to get an estimation of the propagation channel, but also to estimate other effects on the signal such as the phase noise structure at the Tx/Rx, or, a frequency offset in the signal. The reference signal is however also used to estimate time and frequency synchronization, performing measurements for power control, etc. The more reference signals in a system the more is the overhead and the less amount of resources left for actual payload transmission (user data). Hence, although reference signals are essential for proper network operation, the use of them should be minimized.

One special case of the use of reference signal is in LTE for the PUCCH channel when using format 1. In this case, a reference signal is first used for channel estimation purposes and for coherent detection. That is, the reference signal is used to provide the reference phase to the other symbols in the transmitted symbol sequence. Symbols other than the reference signals in the sequence are identical to the reference signal(s) with the difference that information is carried in a phase relative to the reference signals used for coherent detection. If, for example, 2-bit information is to be transmitted on PUCCH, there are $2^2=4$ different phases possible to transmit. Hence, although not referred to as reference signals by the specification, they contain the same signal structure and properties, and the invention equally well applies to those types of signals.

Reference signals are also an important factor for MIMO transmissions. In this case, multiple signals can be simultaneously transmitted and, in of reference signals, the structure of them can be controlled, and they should be designed to be as orthogonal as possible to avoid interference.

It can be noted that in a time synchronized network, the reference signals could also be overlapping between cells, and hence designing the signals to be as orthogonal as possible will allow inter-cell interference to be minimized over the reference signals.

Implications from RF Implementations

ON/OFF Time Mask

For a transmitter to not cause harmful interference to the network and in order not to transmit when it has no useful signal for the receiver to send, an ON/OFF time mask is defined in the LTE specifications. In the OFF region the transmitter is not allowed to transmit and cause harmful interference while in the ON region the signal need to follow the theoretical signal to a certain extent (which is ensured by the EVM requirement). Between the end of the OFF region and the start of the ON region is a transition period where the signal is undefined. Transitions take place for example when turning off/on RF components and when for example changing frequency where the oscillators must be re-turned and stabilized.

As stated in TS 36.101, v 14.1.0, Section 6.3.4:

The General ON/OFF time mask defines the observation period between Transmit OFF and ON power and between Transmit ON and OFF power. ON/OFF scenarios include; the beginning or end of DTX, measurement gap, contiguous, and non-contiguous transmission.

The OFF power measurement period is defined in a duration of at least one sub-frame excluding any transient periods. The ON power is defined as the mean power over one sub-frame excluding any transient period.

There are no additional requirements on UE transmit power beyond that which is required in subclause 6.2.2 and subclause 6.6.2.3.

FIG. 6 illustrates the current ON/OFF time mask requirement in the current LTE specification. As seen above, the ON/OFF time mask is design for 1 ms TTI in Rel-8 legacy LTE systems.

There are multiple aspects of the problem with the existing solutions. The main problem is demonstrated in FIG. 5 where it is shown that for a 2 symbol sTTI there is a 50% overhead from the reference signal (DMRS). This can be comparable to a typical OFDM system where maybe 10% overhead is allocated to the reference signal, or, to legacy LTE with 1 ms TTI where ⅐ of the resources are allocated to DMRS, see also the top portion of FIG. 5.

In addition, it may be noted that implications from the RF implementation highlighted above do not scale with sTTI duration. This means that the possible "overhead" from the transient period within the sTTI boundaries will increase with a shorter TTI. For example, assume a transient period of 20 □s that occur inside the (s)TTI boundary, and assuming LTE frame structure using normal CP (i.e. OFDM symbol duration of 71.4/71.8 □s=66.7+4.7/5.1). Then, the transient period will constitute roughly 4% of the 1 ms TTI duration (2*20/14*71.4), while for a 2 OFDM symbol sTTI the transient period would constitute roughly 28% (2*20/2*71.4).

Furthermore, if the transient period distorts the reference signal, since there is no requirement on signal structure within the transient period, the orthogonality between time synchronized and frequency overlapping signals will be distorted/destroyed. FIG. 7 illustrates the ideal versus real transient period. When the different transmitting nodes (UE1, UE2) distort the signal, the orthogonality (which is defined over the full symbol duration) is destroyed, since nothing can be said about the signal characteristics in this region.

SUMMARY

To address the foregoing problems with existing solutions, disclosed is systems and methods for minimizing performance impact from known signal distortions.

According to certain embodiments, a method in a wireless device includes generating a signal comprising repeating segments for transmission in a subslot duration transmission time interval (TTI) to a network node. The signal comprising the repeating segments is transmitted to the network node in the subslot duration TTI.

According to certain embodiments, a wireless device includes processing circuitry configured to generate a signal comprising repeating segments for transmission in a subslot duration TTI to a network node. The signal comprising the repeating segments is transmitted to the network node in the subslot duration TTI.

According to certain embodiments, a method in a network node includes receiving a signal from a wireless device and discarding at least one portion of the signal. The at least one portion that is discarded includes at least one of a plurality of repeating segments in the signal. Processing is performed on a remaining portion of the signal that does not include the at least one discarded portion of the signal.

According to certain embodiments, a network node includes processing circuitry configured to receive a signal from a wireless device and discard at least one portion of the signal. The at least one portion that is discarded includes at least one of a plurality of repeating segments in the signal. Processing is performed on a remaining portion of the signal that does not include the at least one discarded portion of the signal.

Certain embodiments of the present disclosure may provide one or more technical advantages. For example, certain embodiments may improve performance in case the transmitted signal is distorted and it is known to the coordinating/receiving node where the signal distortions occur.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
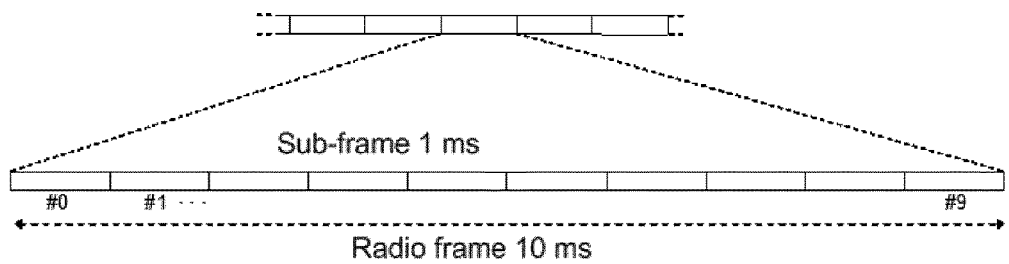
FIG. 1 illustrates the Long Term Evolution (LTE) time-domain structure.
Figure 2:
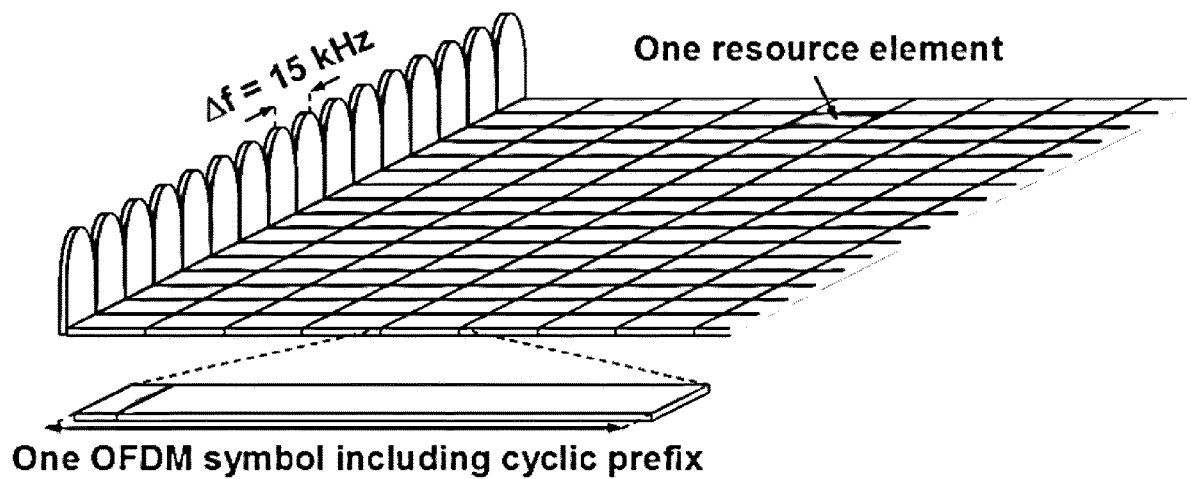
FIG. 2 illustrates the basic LTE downlink physical resource.
Figure 3:
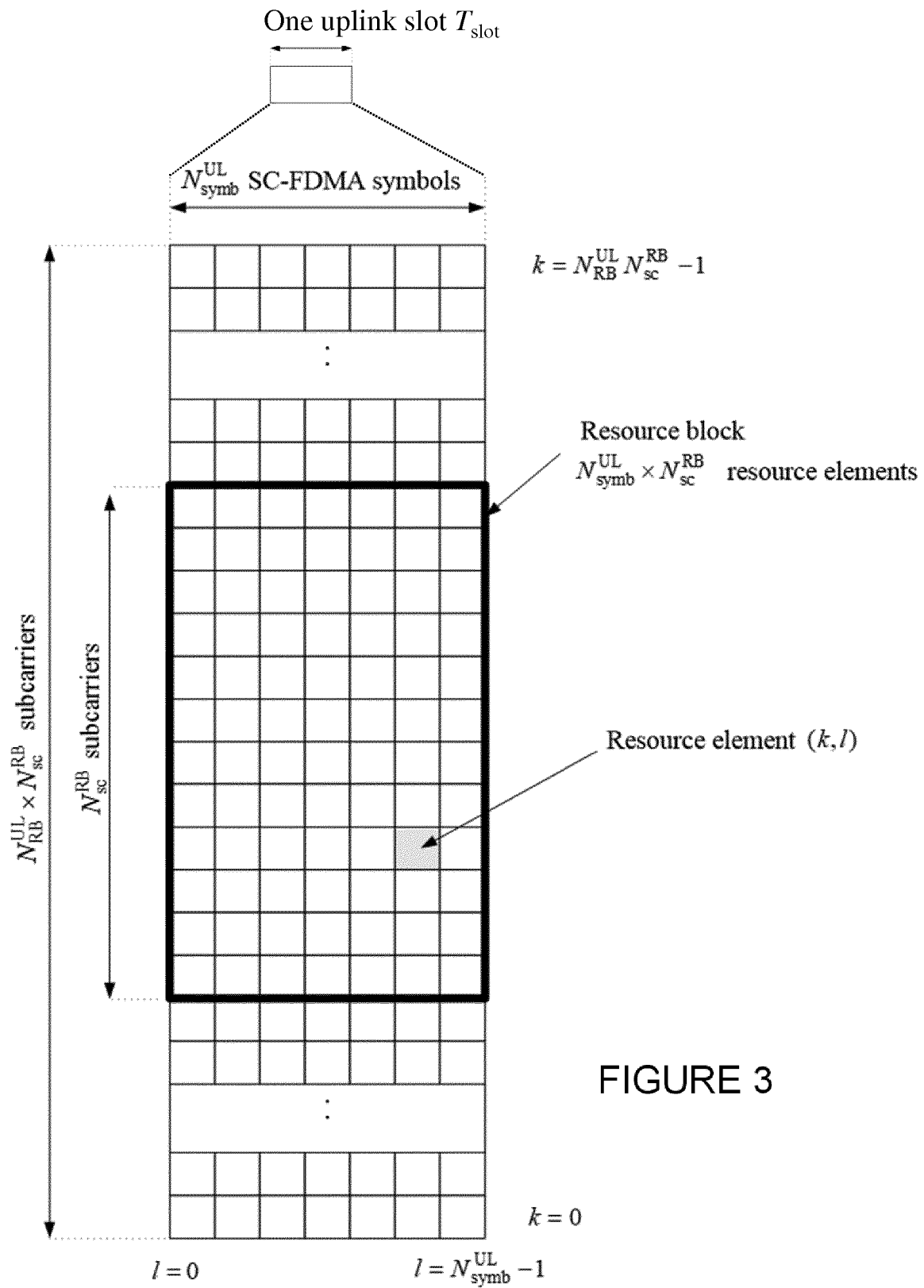
FIG. 3 illustrates an LTE uplink resource grid.
Figure 4:
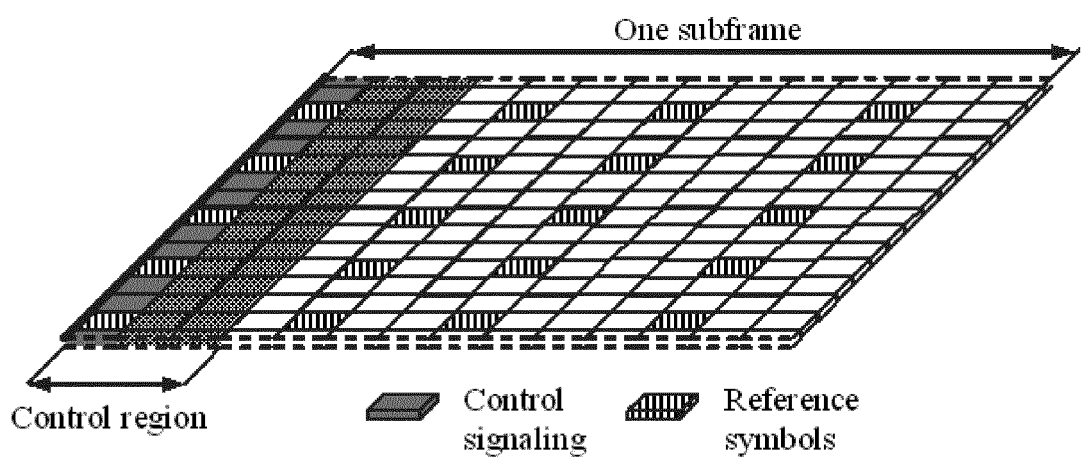
FIG. 4 illustrates a downlink system.
Figure 5:
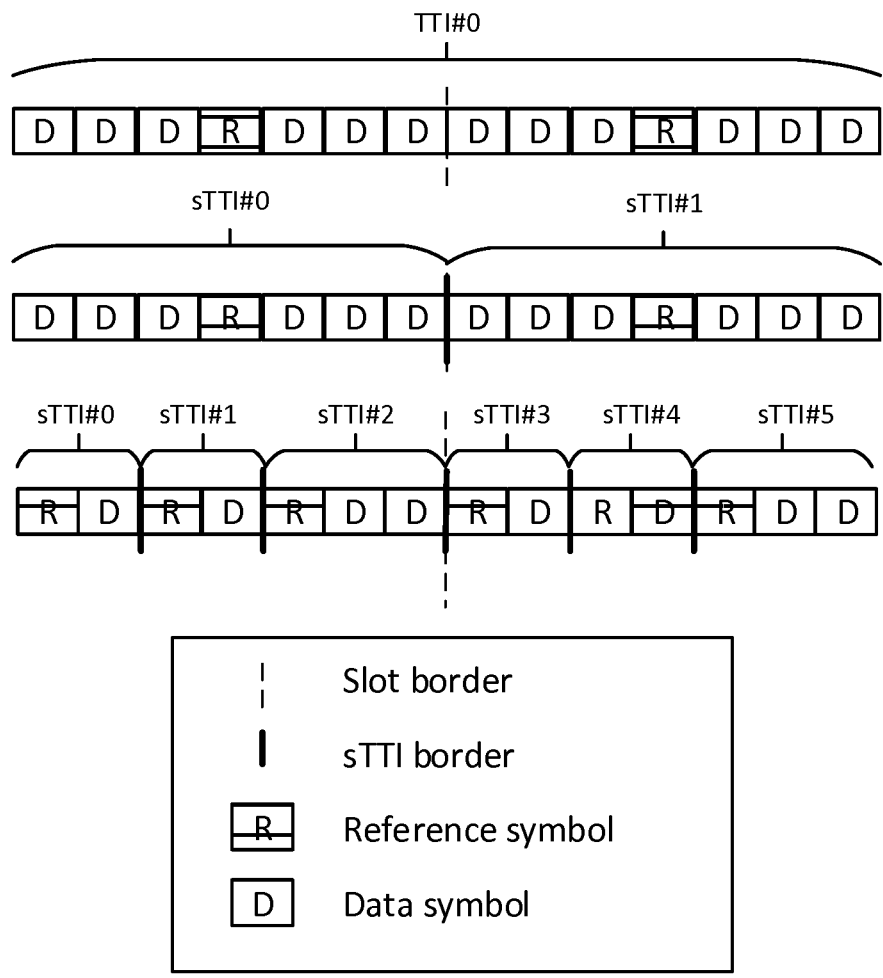
FIG. 5 illustrates an example 2/3-symbol sTTI configuration with uplink subframe.
Figure 6:
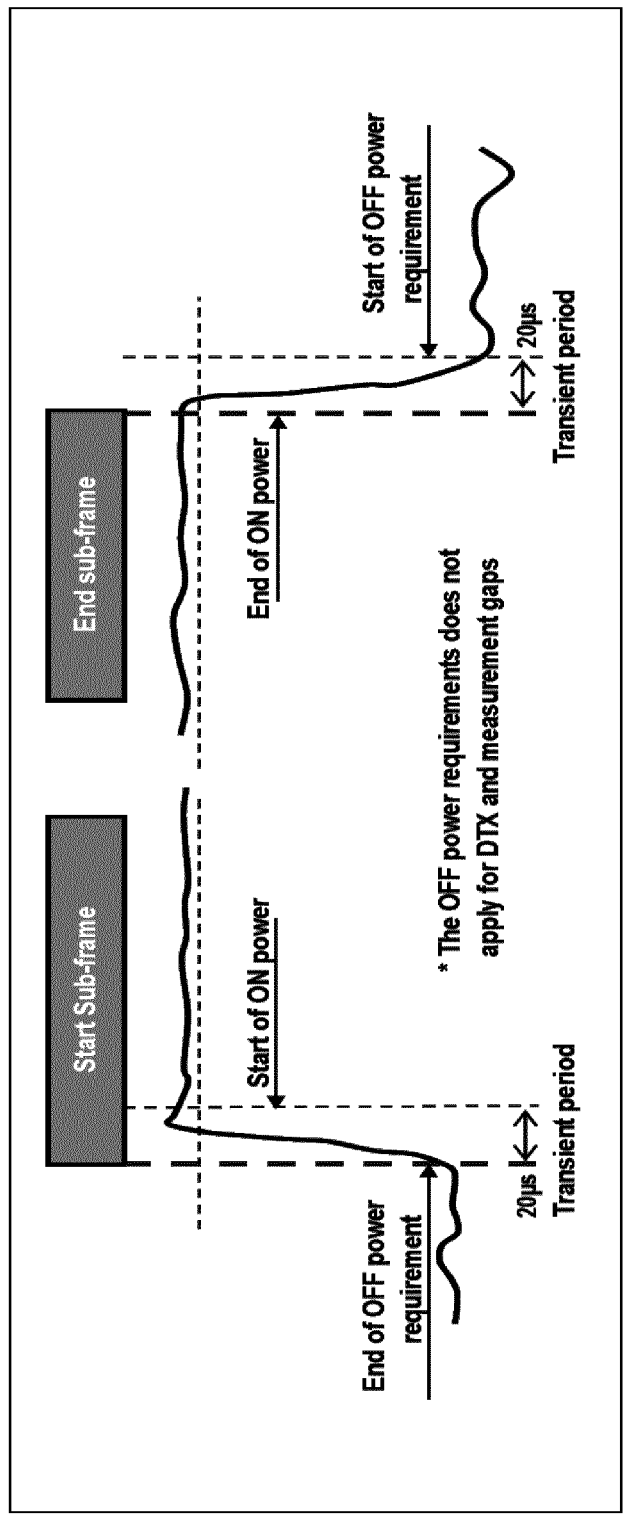
FIG. 6 illustrates a general ON/OFF time mask.
Figure 7:
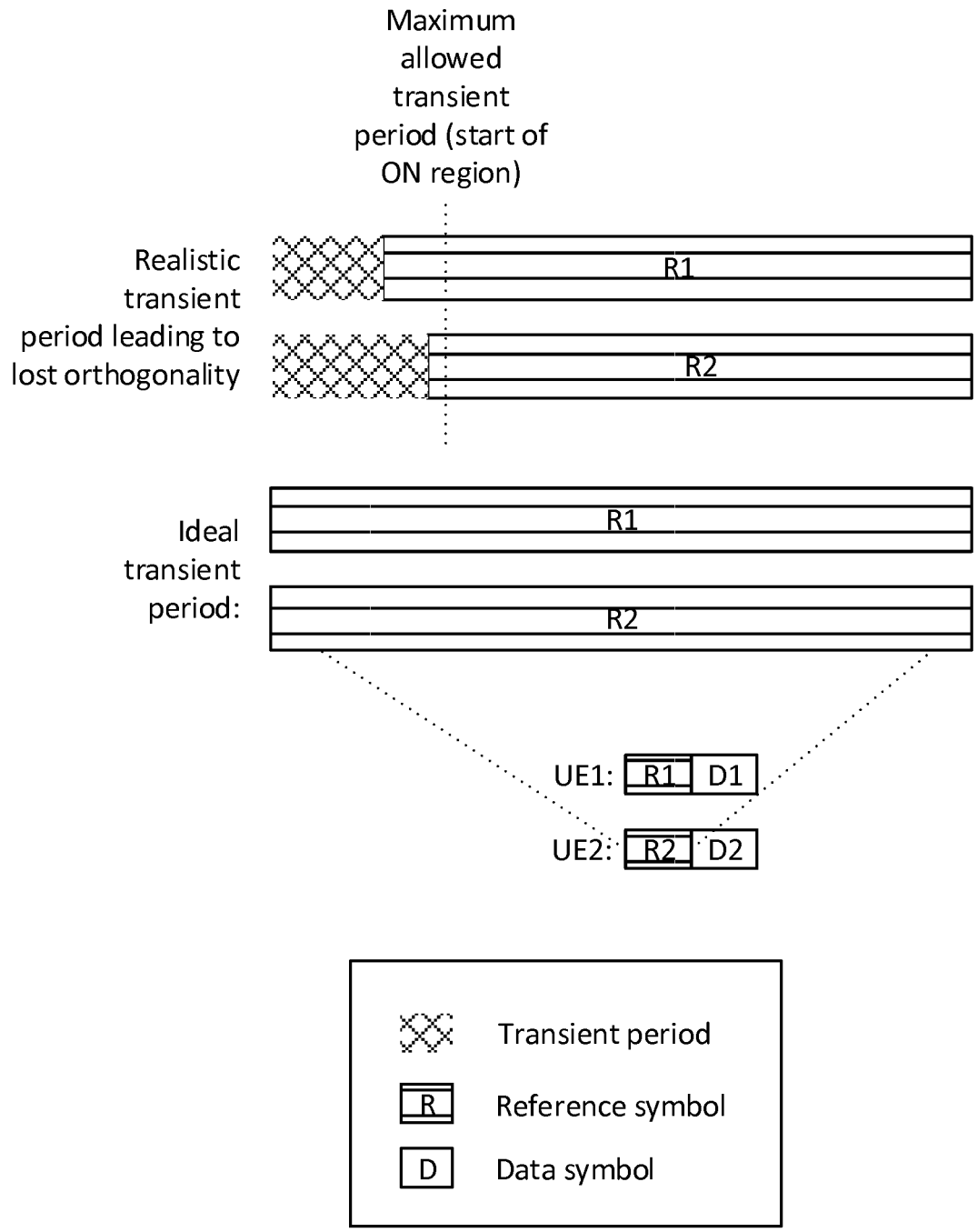
FIG. 7 illustrates an ideal versus realistic transient period.

Particular embodiments of the present disclosure may provide solutions for minimizing performance impact from known signal distortions. Particular embodiments are described in FIGS. 1-24 of the drawings, like numerals being used for like and corresponding parts of the various drawings.

As disclosed herein, the terms 'first node' and 'second node' may be used to refer two nodes. An example of a first node could be a network node, which could be a more general term and can correspond to any type of radio network node or any network node, which communicates with a UE and/or with another network node. Examples of network nodes are described below with respect to FIG. 20.

Another example of a node could be a wireless device, which may also be referred to by the non-limiting term user equipment (UE). It may refer to any type of wireless device communicating with a network node and/or with another UE in a cellular or mobile communication system. Examples of wireless devices are described below with respect to FIG. 16.

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term signal used herein can be any physical signal or physical channel. Examples of physical signals are reference signal such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH etc.

The term time resource used herein may correspond to any type of physical resource or radio resource expressed in terms of length of time. Examples of time resources are: symbol, time slot, subframe, radio frame, TTI, interleaving time, etc.

The term TTI used herein may correspond to any time period (T0) over which a physical channel can be encoded and interleaved for transmission. The physical channel is decoded by the receiver over the same time period (T0) over which it was encoded. The TTI may also interchangeably called as short TTI (sTTI), transmission time, slot, subslot, sub-slot, subslot duration TTI, mini-slot, mini-slot duration TTI, short subframe (SSF), mini-subframe etc. In some aspects, the short TTI, also known as a subslot or mini-slot, or short subframe (SSF) or mini-subframe, may have a duration of e.g. 1, 2, 3, 4 or 7 symbols. In some aspects, the short TTI has a time duration of 0.5 ms or less. Aspects of the disclosure may apply to a subslot, mini-slot and/or slot duration TTI.

The term requirements used herein may comprise any type of UE requirements related to UE measurements aka radio requirements, measurement requirements, RRM requirements, mobility requirements, positioning measurement requirements etc. Examples of UE requirements related to UE measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, CGI acquisition delay etc.

According to certain embodiments, different reference signals may be chosen based on known signal distortions. The signal distortions may be defined by, for example, switching transients, changes in AGC settings, increase in EVM, frequency offsets applied to the signal, etc. The structure of the distortions is not assumed to be known by the receiving node, but it may be known over which part of the signal distortions could be expected. One example of such distortions is the transient period defined in LTE, where no requirements on the signal structure are defined. The transient period duration and placement is, however, well defined, and hence the receiving node may be aware of where distortions to the signal could be expected. The selection of the reference signals can, for example, be based on the criteria of minimizing inter-user interference (maintaining orthogonality), and minimizing any error in the channel estimation.

In certain embodiments, the use of the term 'reference signal' may refer to a signal with predefined signal characteristics, and need not be a signal specifically referred to as a 'reference signal' in specification text or similar.

DMRS may be designed is to take known distortions into account. In certain embodiments, the IFDMA design may be modified by zeroing out some sub-carriers before IFFT to cope with the transient period problem. In certain embodiments, a certain IFDMA design may be signaled to the wireless device. In other embodiments, multiple IFDM sets and/or repetitions in time may be used and these may be signaled to the wireless device. As a result of the IFDMA design, the wireless device may repeat one or more segments to minimize the performance impact from the transient period. Using the knowledge of the transmitted IFDMA signal, a receiver may then discard the one or more repeated segments to maintain orthogonality.

Figure 8:
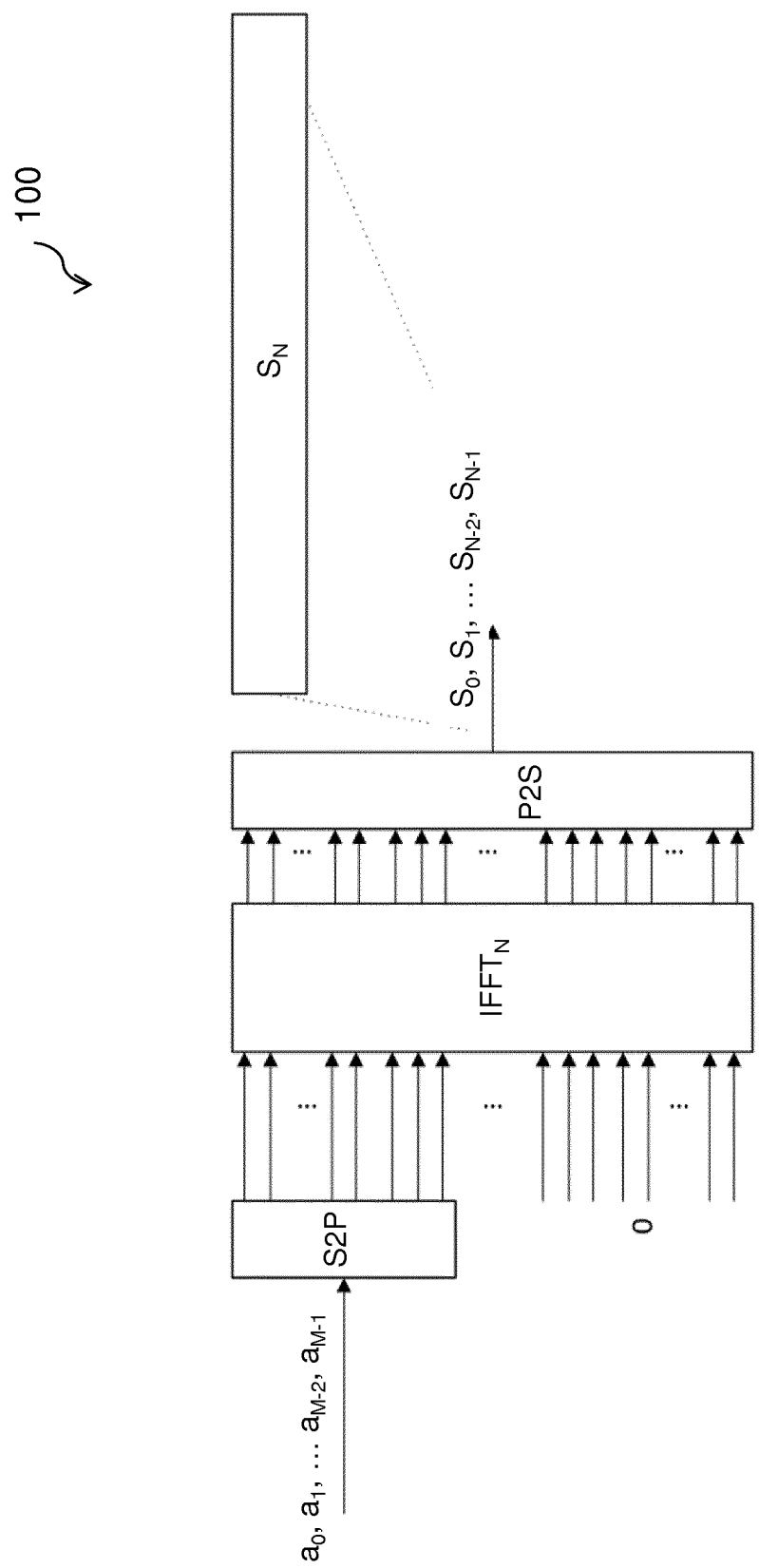
FIG. 8 illustrates example reference modulation without symbol cancellation, according to certain embodiments.
Figure 9:
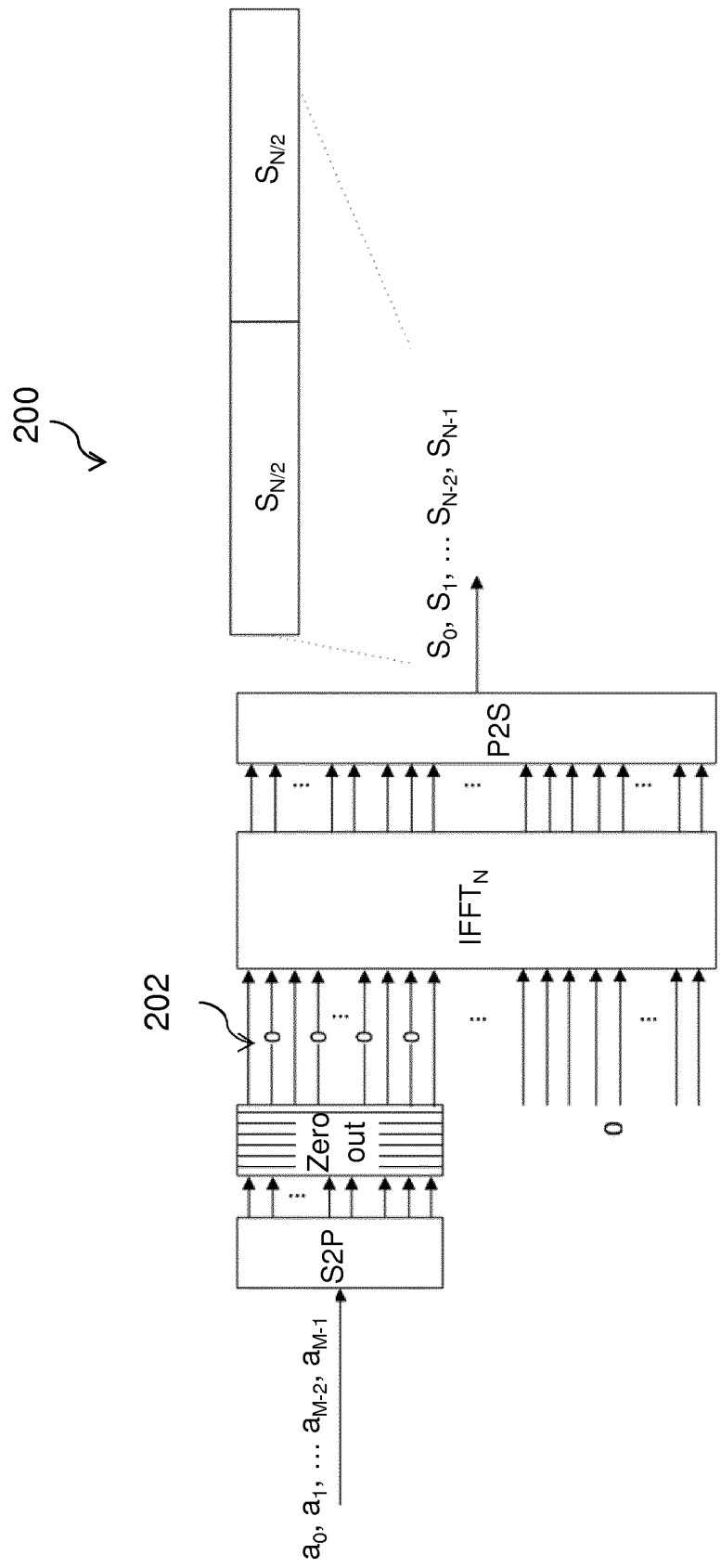
FIG. 9 illustrates example reference modulation with every other symbol cancelled out, according to certain embodiments.
Figure 10:
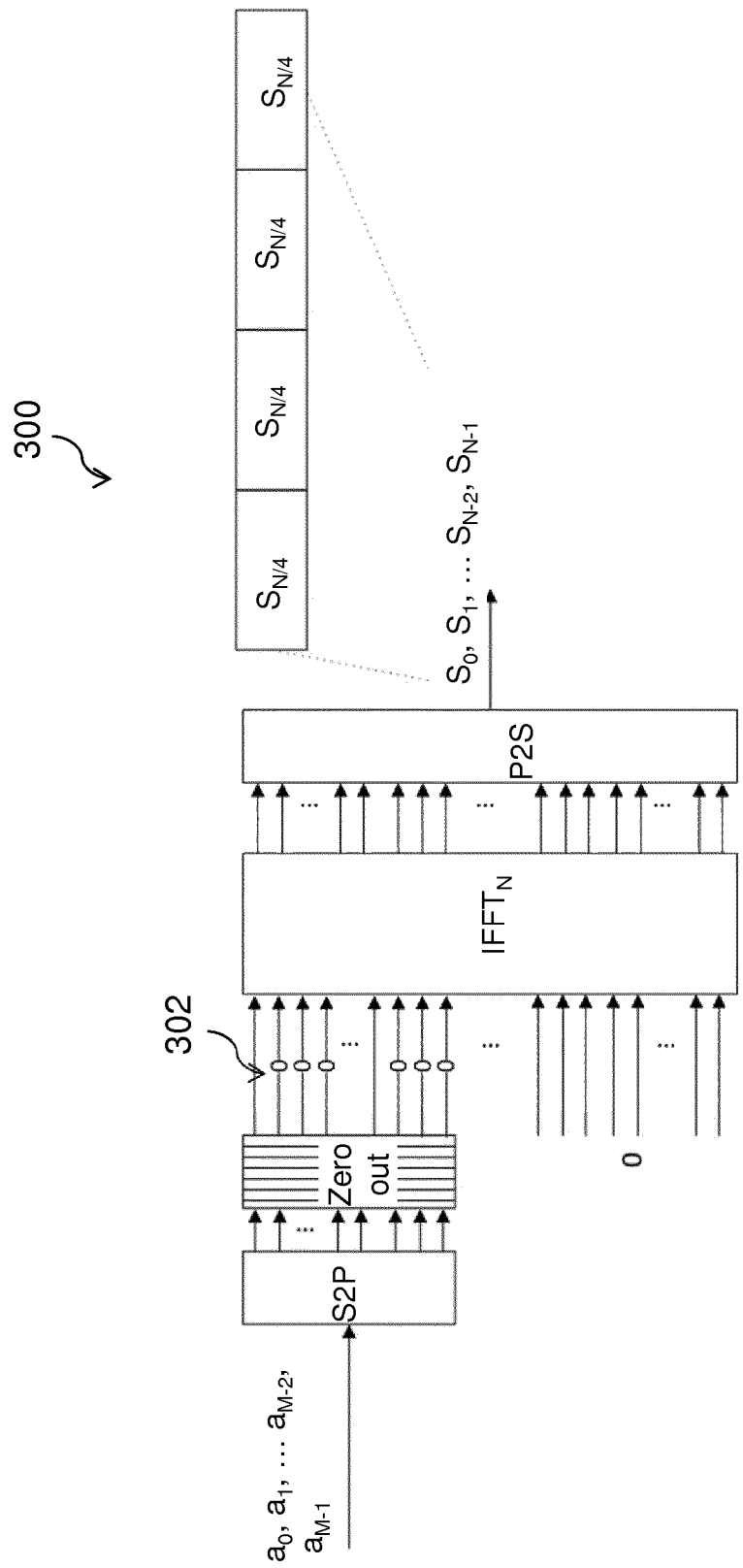
FIG. 10 illustrates example reference modulation with every fourth symbol cancelled out, according to certain embodiments.
Figure 11:
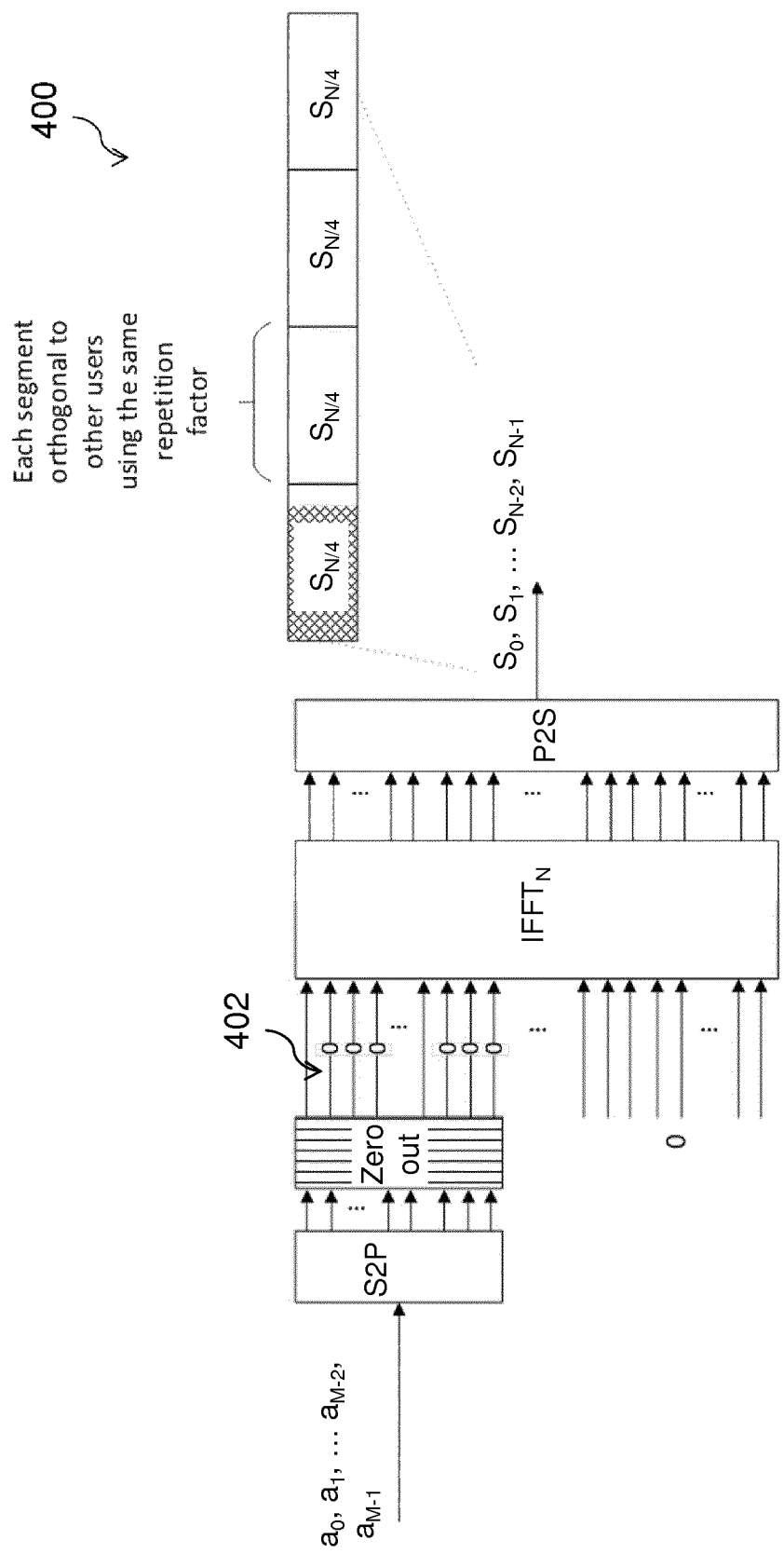
FIG. 11 illustrates example reference modulation with every fourth symbol cancelled out based on known signal distortions, according to certain embodiments.

In one embodiment, the orthogonality in the reference signal is ensured by generating an OFDM modulation where the symbols of the reference signal prior to the IFFT modulation are set to zero energy, except every other, every third, or every fourth, etc. symbol which are kept. FIG. 8 illustrates example reference modulation 100 without symbol cancellation, according to certain embodiments. Conversely, FIG. 9 illustrates example reference modulation 200 with every other symbol 202 cancelled out, according to certain embodiments, and FIG. 10 illustrates example reference modulation 300 with every fourth symbol 302 cancelled out, according to certain embodiments. It should be noted that the "zeroing out" of symbols equally well could be implemented as defining a vector 'a' of symbols having M/2, or M/4 elements, for the embodiment in FIG. 9 and FIG. 10, respectively. Furthermore, the OFDM modulation need not be realized with an IFFT operation, but could for example be achieved with N parallel separately modulated signals set to appropriate frequencies. In a particular embodiment, for example, the number of repetitions (i.e., repeated segments) may be selected so that the first repetition (i.e., first repeated segment) time period is longer than the determined distortion time period.

In certain embodiments, zeroing-out all symbols except every $2^{nd}$, $3^{rd}$, $4^{th}$ etc., may result in the signal being repeated in time by a factor of 2, 3, 4 respectively.

In each repeated segment, orthogonality may be kept between users simultaneously transmitting on the same resources, using the same level of repetitions.

In certain other embodiments, there may be no additional repetitions factors applied to the reference signal. Instead, the combination of reference signals to be used in a given symbol transmission by one or more transmitting nodes, where the extent of the signal distortions is known, may be chosen by the coordinating node (typically the network) in order to minimize the overall cross-correlation. The set of reference signals can be based on existing reference signals and no new design may be specified.

In such an embodiment, it may be of benefit for each transmitting node to be assigned multiple reference signals. The coordinating node may communicate, to each transmitting node, which reference signal to use dynamically. In LTE, the assignment of reference signals is carried out on RRC level, while the selection from the assigned reference signals are dynamically controlled in DCI.

In a particular embodiment, relating to the repetition of reference signals, the repetition factor in time (or equivalently the ratio of symbols not zeroed out) may be chosen based on the extent of the known signal distortions. For example, if the maximum known distortion is just below ¼ of a symbol duration, an appropriate value of the repetition factor would be 4, which ensures that orthogonality is kept over the remaining ¾ of the total symbol duration. Or more generally put, if the signal distortion is lower than 1/M of the symbol duration, the repetition factor N (integer) may be chosen so that N<M. In a particular embodiment, for example, the number of repetitions (i.e., repeated segments) may be selected so that the first repetition (i.e., first repeated segment) time period is longer than the determined distortion time period.

It is noted that 'orthogonality' as mentioned here does not mean true orthogonality, but could rather be seen as two signals having low cross correlation properties over the expected time lags of the signal. It may also be noted that the low cross correlation does not come from the modulation itself but that different vectors of 'a' (see for example FIG. 11) being assigned to different users, which are in themselves designed with the used modulation type in mind to achieve low cross correlation. In LTE, these sequences are chosen as Zadoff-Zhu sequences, or computer generated sequences that possess the orthogonal properties when modulated.

In certain other embodiments, the repetition factor used may be chosen by the transmitting node based on the resource allocation. The knowledge of the resource allocation preferably is also available in the receiving node in order to know the reference signal used. In a particular embodiment applicable to LTE, for example, the resource allocation here could refer to the placement of the DMRS symbol in the sTTI, which is signaled in DCI or sDCI, and the associated known transient period that could depend on the placement of the DMRS, and, potentially also the placement of other signals in the overall frame structure, such as SRS symbols. In an optional particular embodiment, the reference signal structure may be detected by the receiving node, and the structure used may be chosen autonomously by the transmitting node.

In a first example, consider the maximum allowed transient time is 20 µs, but a first LTE UE can perform the transition within 4 µs. In this case, no repetition would be needed (CP covers already 4.7 µs of the signal). A second UE could instead need 10 µs in which case a repetition factor of 8 could be used, and if the receiving node can properly detect the repetition factor used, ⅞ of the signal (if assuming 4.7 µs CP, there is only 5.3 µs left, and ⅛ of the symbol is already 8.3 µs) can be used in the synchronization and channel estimation. In this case the repetition factor selection would be based on different implementations and the choice signaled to, pre-defined or detected by the receiving node.

Figure 12:
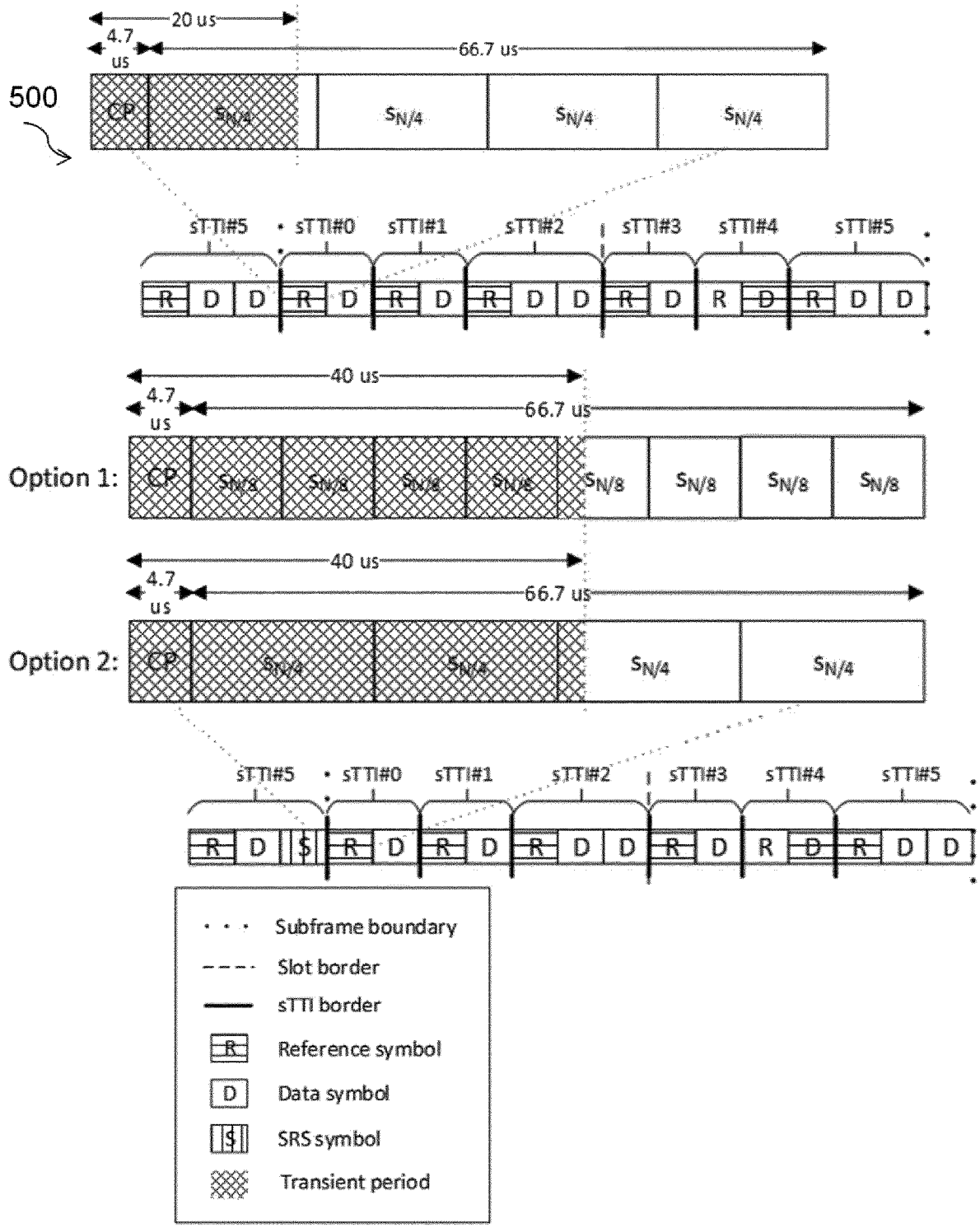
FIG. 12 illustrates an example LTE sTTI configuration with 20 μs and 40 μs transient period, according to certain embodiments.

A second example is provided using the LTE specifications where the ON/OFF time mask is applied differently depending on the resource allocation in the overall frame structure, and also if the transmission is split over different frequencies, see 3GPP TS 36.101, sub-clause 6.3.4. FIG. 12 illustrates an LTE example 500 with 20 µs or 40 µs transient period, according to certain embodiments. Specifically, in FIG. 12, two cases are depicted where the DMRS is placed in the first symbol in the first sTTI of the subframe. The last symbol in the preceding subframe is either data (top), or SRS (bottom). According to the 3GPP specification, the allowed transient time if the preceding symbol is data, is 20 µs, while it is 40 µs in case of SRS.

As can be seen in FIG. 12, in case of 20 µs switching, a repetition factor of 4 is suitable, while for the 40 µs case, this would result in only ¼ of the signal being orthogonal (option 2), while if a repetition factor of 8 is used, ⅜ can be kept orthogonal (option 1).

Receiving only ¾th of the signal (in case of 20 µs transition period), or ⅜ of the signal (in case of 40 µs transition period) may still provide a DMRS overhead of 43% and 27% respectively, which may be comparable to the current DMRS overhead of 14%. Since the reference signal with the new design is properly structured over the part of the signal used by the receiving node, it may be possible to keep orthogonality between users transmitting DMRSs using different sequences, as well as for the receiver to perform a proper channel estimate that can be used to demodulate the data symbol(s) in the same sTTI.

In this example the application of the repetition factor is based on existing requirements in the specifications. Thus, the receiving node may know apriori which reference signal that is used by the transmitting node.

Figure 13:
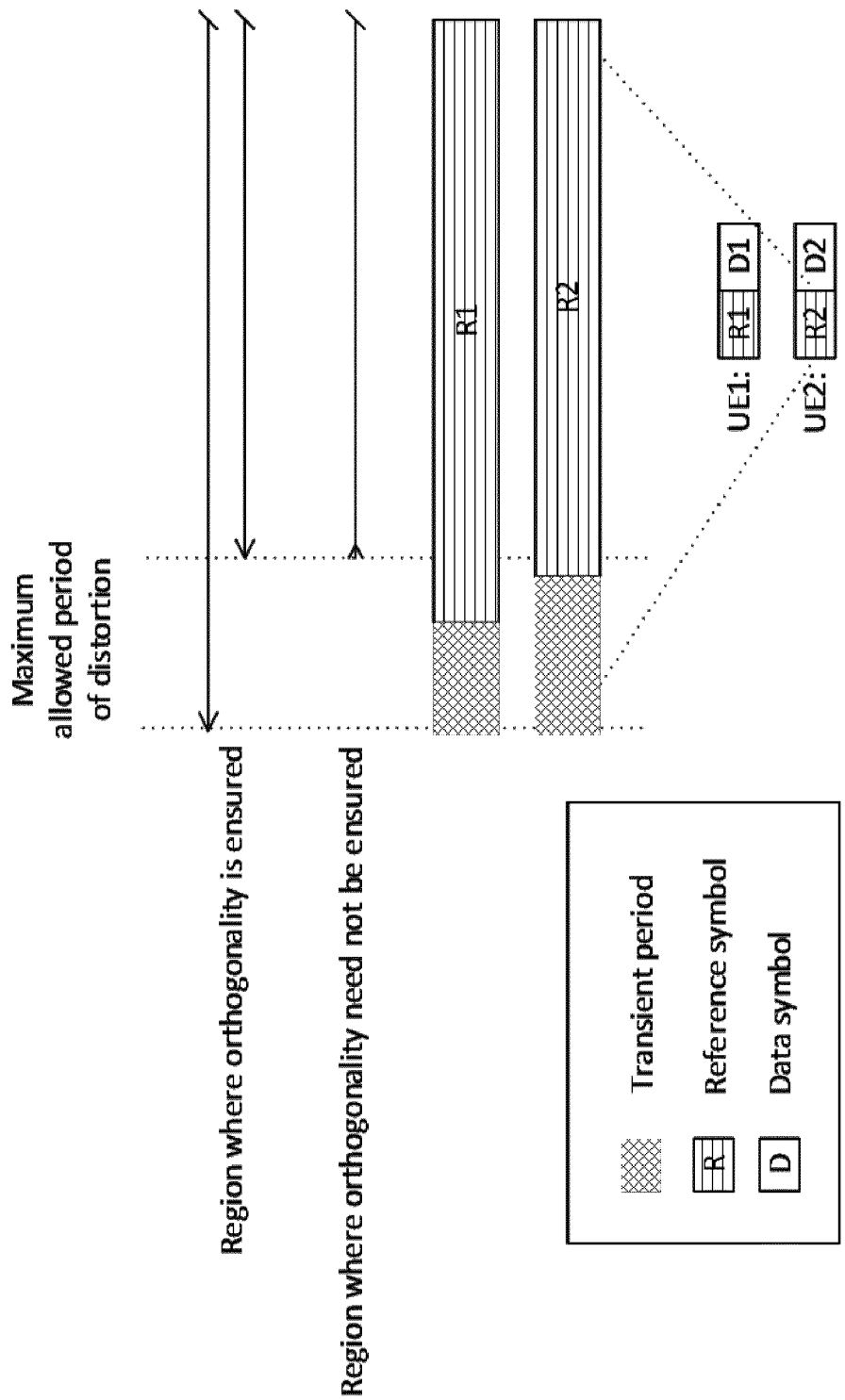
FIG. 13 illustrates example reference modulation of a signal to minimize performance impact from known distortions, according to certain embodiments.

FIG. 13 illustrates example reference modulation 600 of a signal to minimize performance impact from known distortions. It should be noted, however, that the above-described embodiments using different levels of repetition in time (or equivalently zeroing out of sub-carriers in the frequency domain) are just a few exemplary ways to implement the reference signal. In general, a reference signal can be implemented using any modulation as long as the guiding principles of ensuring orthogonality between reference signals over the full part of the signal not having known distortions, optionally also including part(s) of the signal, or the full part of the signal experiencing distortions, as shown in FIG. 13, are kept.

Figure 14:
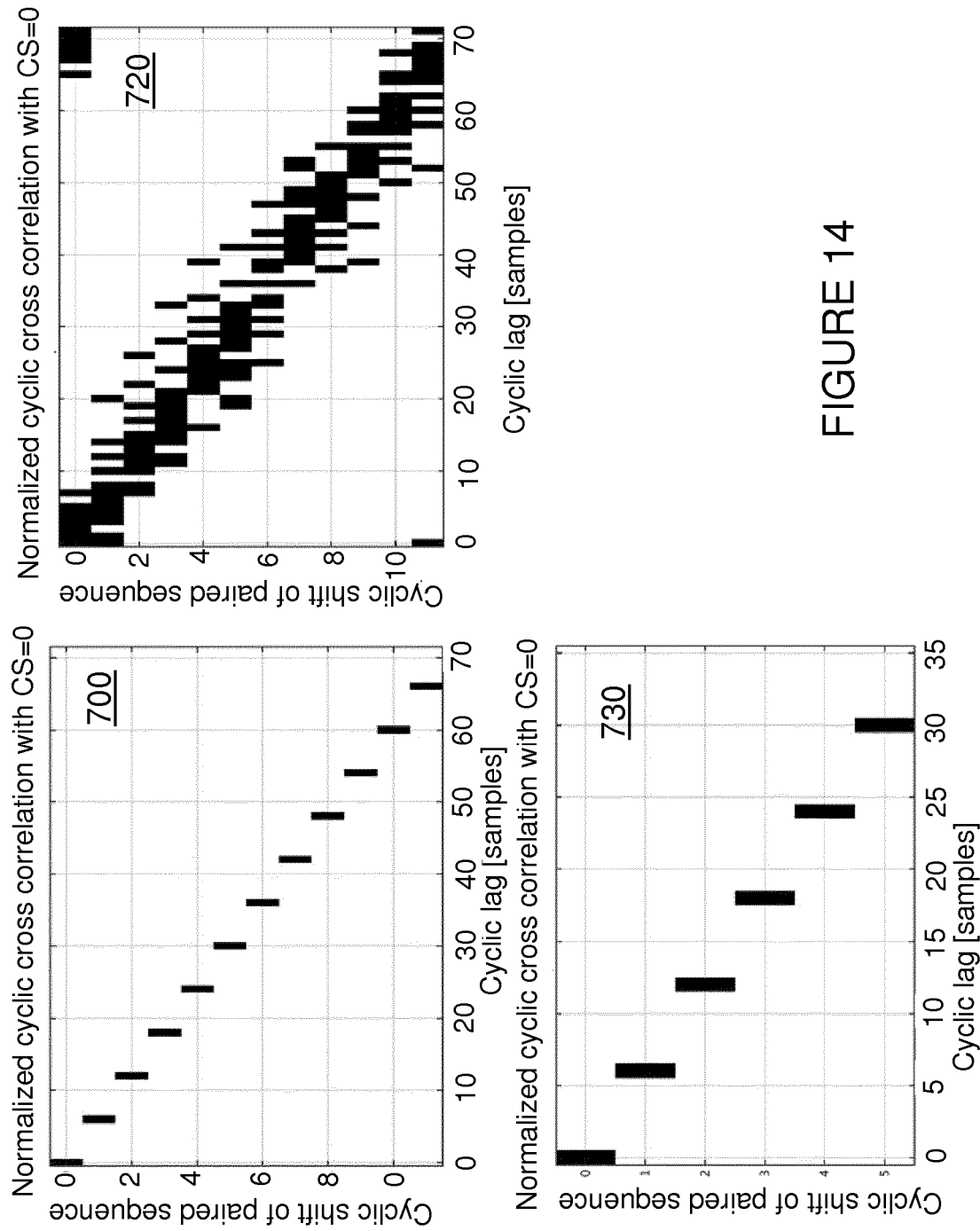
FIG. 14 illustrates three different cases of LTE Zadoff-Chu sequences, according to certain embodiments.

FIG. 14 illustrates three different cases of LTE Zadoff-Chu sequences, according to certain embodiments. More specifically, to better illustrate the problem with orthogonality due to a transient period applied to the reference signal, FIG. 14 shows three different cases where the first case (upper left) shows the cyclic cross-correlation of the reference configuration of the LTE Zadoff-Chu sequences for a 6 PRB allocation applying no transient period. As can be seen, the signals are orthogonal (it is only one position where the correlation is not 0 for a given sequence pair being correlated (each value on the y-axis)) except for the specific cyclic shift applied between the sequences that are correlated. As shown, FIG. 14 shows black color if the normalized correlation value is above 0.05. However, it can be noted that in the upper left plot 700, all black boxes reflect a normalized correlation value of 1. In the upper right plot 720 the cross correlation is shown where around 20% of the beginning of the signal is assumed being cancelled out due to an unknown transition period (apart from its placement). As can be seen, the sequences are no longer orthogonal (there is more than one black box for each row of the plotted matrix). Conversely, if a single repetition is used as shown in FIG. 9, and this is taken into account by the receiver, the orthogonality is again restored. In such a scenario, the receiver would only process the $2^{nd}$ half of the signal.

Accordingly, as may be understood from the embodiments described above, the receiver may take appropriate action to benefit from the modified structure of the reference signal. In certain embodiments, for example, the receiver may know the position and duration of the known distortions to the signal. The receiver may also know how much of the signal needs to be discarded in order to maintain the wanted properties, such as for example, orthogonality between users, of the received reference signal. The unwanted part may, thus, be discarded during further processing, such as synchronization, channel estimation and user separation.

In one particular embodiment related to the repetition based reference signal design, the receiver discards one or more of the repeated segments in order to maintain orthogonality for further processing.

In another particular embodiment, the receiver discards the one or more repeated segments that are impacted by the signal distortions and uses the remaining segments to reconstruct the full signal. It should be noted that this approach does not provide any additional information to the synchronization and channel estimation process, but would allow a receiver to utilize the same receiver algorithms as today in terms of for example FFT size.

In the process of discarding the one or more repeated segments, the duration of the OFDM symbol may effectively be shorter. Thus, the sub-carrier bandwidth may be increased. Furthermore, since the number of repeated segments may also be altered, the amount of zeroed out sub-carriers in the frequency domain may change with the number of repeated segments. In one particular embodiment, the knowledge of the altered frequency grid after reception is taken into account in the equalization process and appropriate interpolation is performed to arrive at a channel response reflecting the propagation channel of the associated data symbols.

Although a modified IFDMA configuration can be used to generate the signal to minimize impact from a transient period, other embodiments may instead make the signal where there is no transient period orthogonal. As such, rather than repeating segments in time according to a selected repetition factor, a single segment may be designed to be orthogonal.

Figure 15:
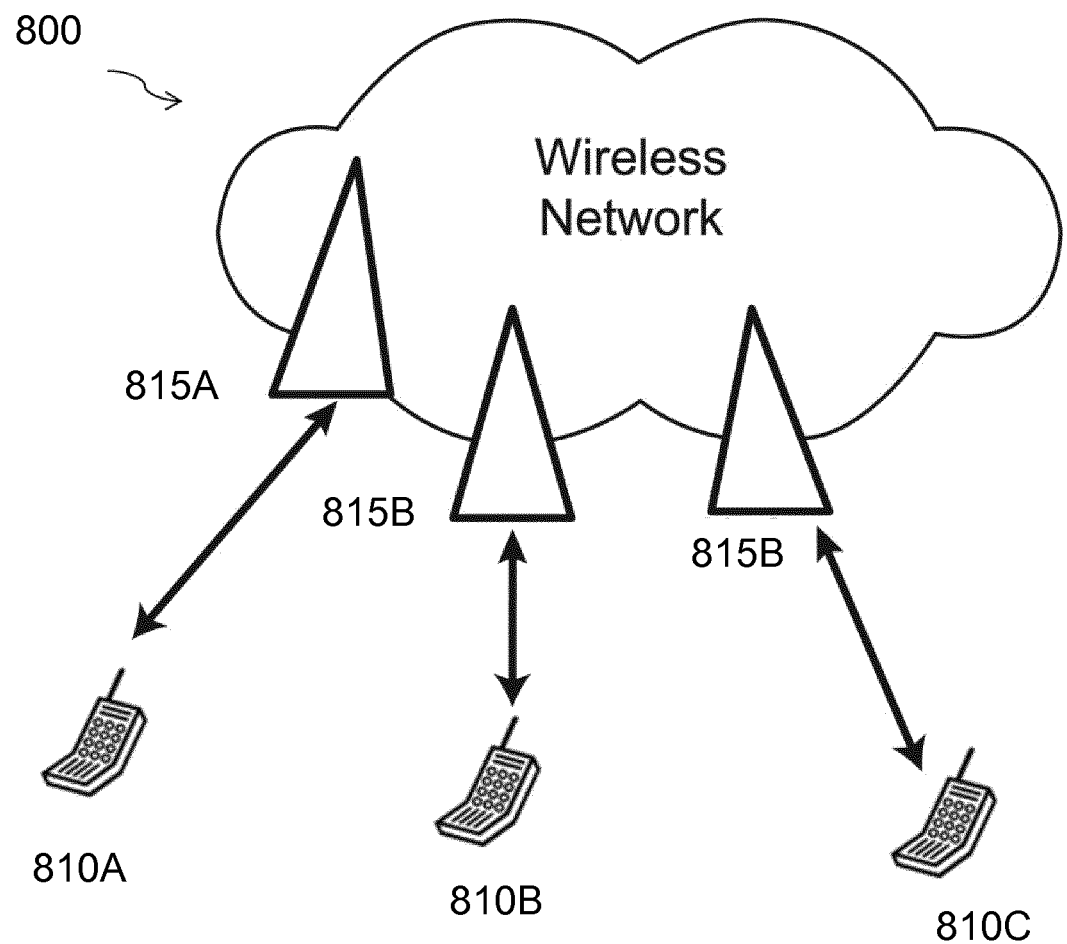
FIG. 15 illustrates an example wireless network for minimizing performance impact from known signal distortions, according to certain embodiments.

FIG. 15 illustrates a wireless network 800 for minimizing performance impact from known signal distortions, in accordance with certain embodiments. Network 800 includes one or more wireless devices 810A-C, which may be interchangeably referred to as wireless devices 810 or UEs 810, and network nodes 815A-C, which may be interchangeably referred to as network nodes 815 or eNodeBs 815. A wireless device 810 may communicate with network nodes 815 over a wireless interface. For example, wireless device 810A may transmit wireless signals to one or more of network nodes 815, and/or receive wireless signals from one or more of network nodes 815. The wireless signals may contain voice traffic, data traffic, control signals, and/or any other suitable information. In some embodiments, an area of wireless signal coverage associated with a network node 815 may be referred to as a cell. In some embodiments, wireless devices 810 may have D2D capability. Thus, wireless devices 810 may be able to receive signals from and/or transmit signals directly to another wireless device 810. For example, wireless device 810A may be able to receive signals from and/or transmit signals to wireless device 810B.

In certain embodiments, network nodes 815 may interface with a radio network controller (not depicted in FIG. 15). The radio network controller may control network nodes 815 and may provide certain radio resource management functions, mobility management functions, and/or other suitable functions. In certain embodiments, the functions of the radio network controller may be included in network node 815. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 810. Wireless devices 810 may exchange certain signals with the core network node using the non-access stratum layer. In non-access stratum signaling, signals between wireless devices 810 and the core network node may be transparently passed through the radio access network. In certain embodiments, network nodes 815 may interface with one or more network nodes over an internode interface. For example, network nodes 815A and 815B may interface over an X2 interface.

As described above, example embodiments of network 800 may include one or more wireless devices 810, and one or more different types of network nodes capable of communicating (directly or indirectly) with wireless devices 810. Wireless device 810 may refer to any type of wireless device communicating with a node and/or with another wireless device in a cellular or mobile communication system. Examples of wireless device 810 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 810 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of wireless devices 810, network nodes 815, and other network nodes (such as radio network controller or core network node) are described in more detail with respect to FIGS. 16, 20, and 24, respectively.

Although FIG. 15 illustrates a particular arrangement of network 800, the present disclosure contemplates that the various embodiments described herein may be applied to a variety of networks having any suitable configuration. For example, network 800 may include any suitable number of wireless devices 810 and network nodes 815, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques described herein are applicable to both LAA LTE and standalone LTE operation in license-exempt channels. The described techniques are generally applicable for transmissions from both network nodes 815 and wireless devices 810.

Figure 16:
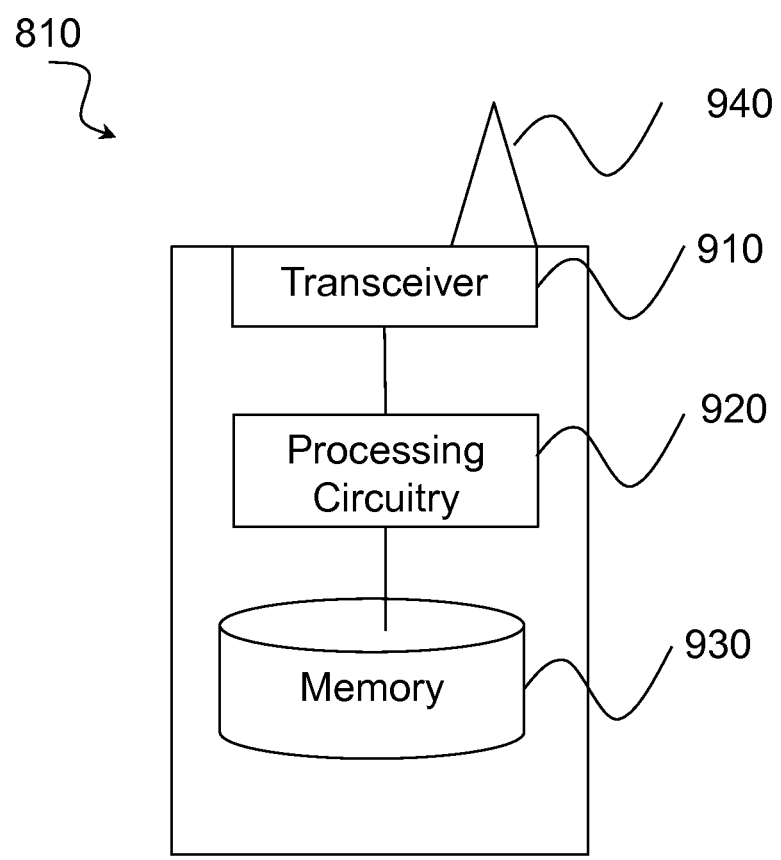
FIG. 16 illustrates an example wireless device for minimizing performance impact from known signal distortions, according to certain embodiments.

FIG. 16 illustrates an example wireless device 810 for minimizing performance impact from known signal distortions, in accordance with certain embodiments. As depicted, wireless device 810 includes transceiver 910, processing circuitry 920, and memory 930. In some embodiments, transceiver 910 facilitates transmitting wireless signals to and receiving wireless signals from network node 815 (e.g., via an antenna), processing circuitry 920 executes instructions to provide some or all of the functionality described above as being provided by wireless device 810, and memory 930 stores the instructions executed by processing circuitry 920. Examples of a wireless device 810 are provided above.

Processing circuitry 920 may include any suitable combination of hardware and software implemented in one or more modules to execute instructions and manipulate data to perform some or all of the described functions of wireless device 810. In some embodiments, processing circuitry 920 may include, for example, one or more computers, one or more central processing units (CPUs), one or more processors, one or more microprocessors, one or more applications, and/or other logic.

Memory 930 is generally operable to store instructions, such as a computer program, software, an application including one or more of logic, rules, algorithms, code, tables, etc. and/or other instructions capable of being executed by processing circuitry. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 810 may include additional components beyond those shown in FIG. 16 that may be responsible for providing certain aspects of the wireless device's functionality, including any of the functionality described above and/or any additional functionality (including any functionality necessary to support the solution described above).

Figure 17:
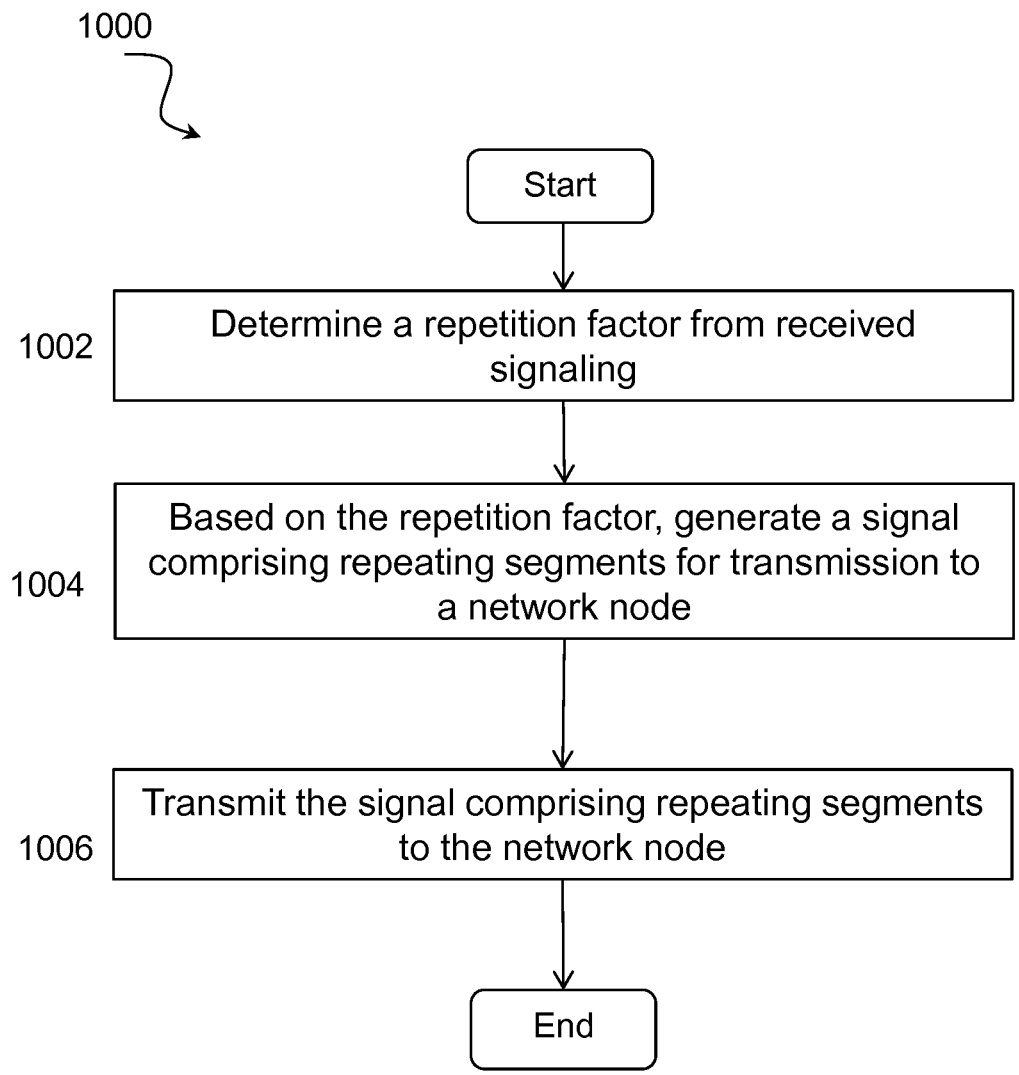
FIG. 17 illustrates an example method by a wireless device for minimizing performance impact from known signal distortions, according to certain embodiments.

FIG. 17 illustrates an example method 1000 by a wireless device 810 for minimizing performance impact from known signal distortions, according to certain embodiments. The method begins at step 1002 when wireless device 810 determines a repetition factor from received signaling.

At step 1004, wireless device 810 generates a signal comprising repeating segments based on the repetition factor. In certain embodiments, the repetition factor is selected based on a position and duration of known signal distortions and is in addition to a cyclic prefix. In certain embodiments, the repeating segments are within a symbol. For example, in a particular embodiment, the repeating segments may be repeated in time consecutive segments within a single symbol duration.

In certain embodiments, the duration of known signal distortions comprises an LTE transient period that is caused by an ON/OFF time mask. In a particular embodiment, the number of repeated portions is two. In other particular embodiments, the number of repeated portions may be 3 or 4.

At step 1006, wireless device 810 transmits the signal comprising the repeating segments to the network node 815. In certain embodiments, the signal may be transmitted in a short transmission time interval (TTI).

In certain embodiments, the method may additionally include the wireless device 810 receiving an assignment of reference signals from the network node and determine the repetition factor based on the assignment. In a particular embodiment, the assignment of reference signals may be received in RRC signaling. In a particular embodiment, the repetition factor may be selected based on a maximum known distortion. For example, if the maximum known distortion is lower than 1/M of the duration, a repetition factor N is selected so that N is less than M. In a particular embodiment, for example, the number of repetitions (i.e., repeated segments) may be selected so that the first repetition (i.e., first repeated segment) time period is longer than the determined distortion time period.

In certain embodiments, the method may include generating inputs to an Inverse Fourier Transform unit and the outputs of the Inverse Fourier Transform unit may comprise the repeating segments or sequences. Stated differently, wireless device 110 may repeat in time, the consecutive segments, within a single symbol duration, and the result of the zeroed inputs may result in the repeated segments or sequences. In various particular embodiments, all symbols of the inputs to the Inverse Fourier Transform unit may be zeroed out except every second, third, or fourth symbol. In a particular embodiment, the zeroed out symbols may result in the repeated segments. In certain embodiments, the Inverse Fourier Transform unit may be reconfigured to produce a segment that is shorter than a full symbol. In other embodiments, the inputs to the Inverse Fourier Transform unit may automatically result in the shorter than a full symbol.

Figure 18:
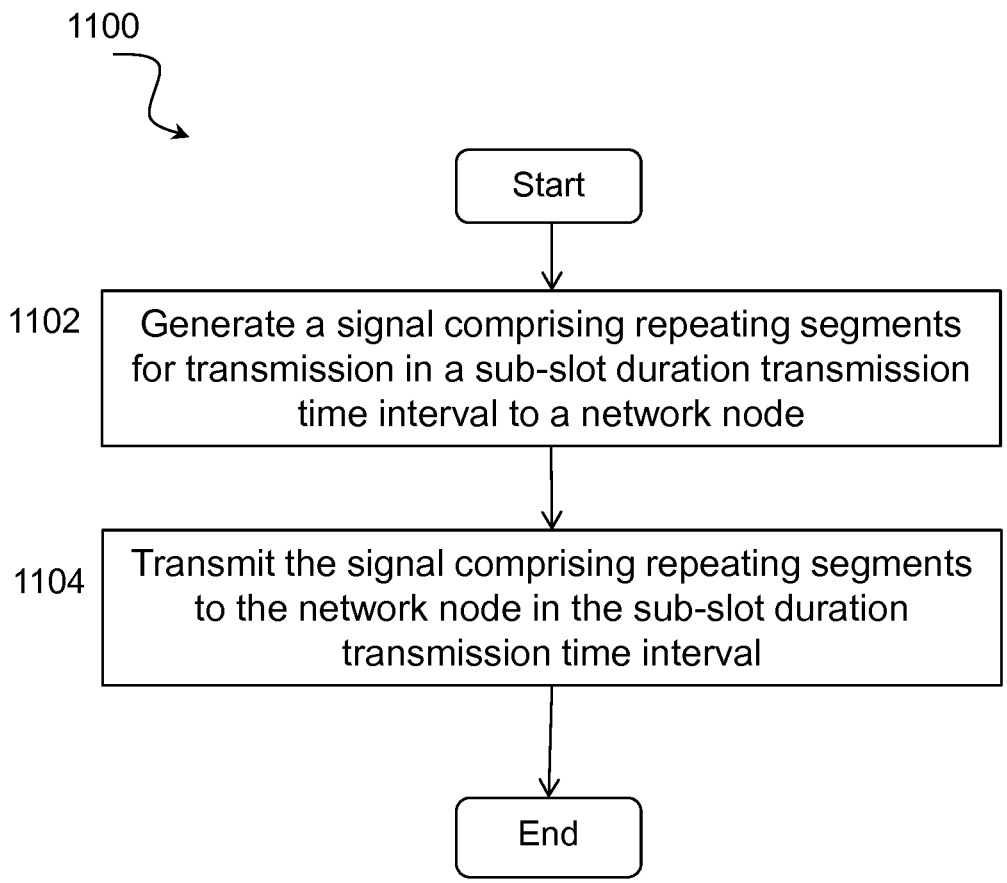
FIG. 18 illustrates another example method by a wireless device for minimizing performance impact from known signal distortions, according to certain embodiments.

FIG. 18 illustrates another example method 1100 by a wireless device 810 for minimizing performance impact from known signal distortions, according to certain embodiments. The method begins at step 1102 when wireless device 810 generates a signal comprising repeating segments for transmission to a network node in a subslot duration TTI. Though a subslot duration is described in the example method of FIG. 18, it is recognized that the described techniques are applicable to other possible TTIs such as a short TTI, a slot, or a mini-slot, as just some examples.

According to certain embodiments, the repeating segments are repeated in time consecutive segments within a symbol having a symbol duration. Additionally or alternatively, the repeating segments may be repeated a number of times, and the number of times may be selected based on a known position and/or duration of at least one signal distortion. In a particular embodiment, the repeating segments may be in addition to a cyclic prefix.

In certain embodiments, the known position and/or duration of the at least one signal distortion comprises an LTE transient period that is caused by an ON/OFF time mask. In a particular embodiment, the number of times that the repeating segment is repeated may be selected based on a maximum allowed duration of the signal distortion. For example, when the maximum allowed signal distortion is lower than 1/M of a symbol duration, the number of times may be selected to be less than M. In a particular embodiment, the number of repeated portions may be 2, 3, or 4.

According to certain embodiments, the number of times that the repeating segment is to be repeated may be received or determined from signaling received from the network node. In a particular embodiment, for example, wireless device 810 may receive an assignment of reference signals. Wireless device 810 may determine the number of times that the repeating segment is to be repeated based on the assignment of reference signals. In a particular embodiment, the assignment of reference signals may be received in RRC signaling.

At step 1004, wireless device 810 transmits the signal comprising the repeating segments to the network node 815 in the subslot duration TTI. In a particular embodiment, the signal may include a reference signal.

Figure 19:
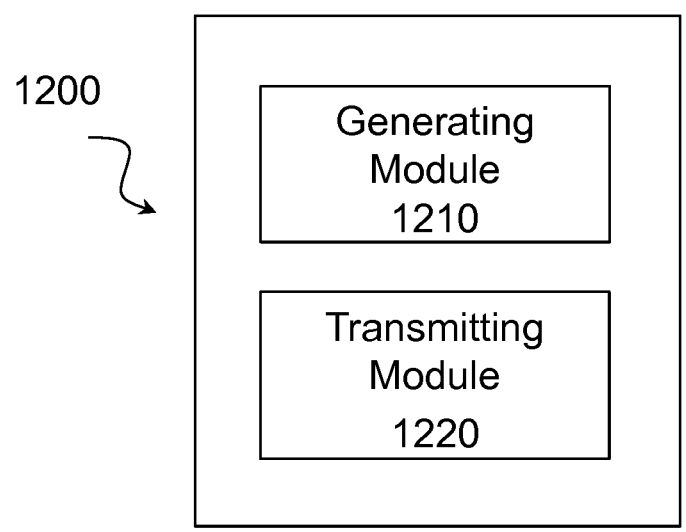
FIG. 19 illustrates an example virtual computing device for minimizing performance impact from known signal distortions, according to certain embodiments.

According to a particular embodiment, the method may additionally include the wireless device 810 generating inputs to an Inverse Fourier Transform unit. Zeroed out symbols in the inputs to the Inverse Fourier Transform Unit may result in outputs that comprise the repeating segments. In a particular embodiment, for example, all symbols in the inputs may be zeroed out except every second symbol such that the result is two repeating segments. In another example embodiment, all symbols in the inputs may be zeroed out except every third symbol such that the result is three repeating segments. In still another example embodiment, all symbols in the inputs may be zeroed out except every fourth symbol such that the result is four repeating segments. In certain embodiments, the method for minimizing performance impact from known signal distortions as described above may be performed by a computer networking virtual apparatus. FIG. 19 illustrates an example virtual computing device 1200 for minimizing performance impact from known signal distortions, according to certain embodiments. In certain embodiments, virtual computing device 1200 may include modules for performing steps similar to those described above with regard to the methods illustrated and described in FIGS. 17 and 18. For example, virtual computing device 1200 may include a generating module 1210, a transmitting module 1220, and any other suitable modules for minimizing performance impact from known signal distortions. In some embodiments, one or more of the modules may be implemented using one or more processing circuitry 920 of FIG. 16. In certain embodiments, the functions of two or more of the various modules may be combined into a single module.

The generating module 1210 may perform the generating functions of virtual computing device 1200. For example, in a particular embodiment, generating module 1210 may generate a signal comprising repeating segments for transmission to a network node in a subslot duration TTI. In certain embodiments, at least a portion of the signal is repeated within the signal based on a known position and/or duration of at least one signal distortion.

The transmitting module 1220 may perform the transmitting functions of virtual computing device 1200. For example, in a particular embodiment, transmitting module 1220 may transmit the signal comprising the repeating segments to the network node 815 in the subslot duration TTI.

Other embodiments of virtual computing device 1200 may include additional components beyond those shown in FIG. 19 that may be responsible for providing certain aspects of the wireless device's functionality, including any of the functionality described above and/or any additional functionality (including any functionality necessary to support the solutions described above). The various different types of wireless device 810 may include components having the same physical hardware but configured (e.g., via programming) to support different radio access technologies, or may represent partly or entirely different physical components.

Figure 20:
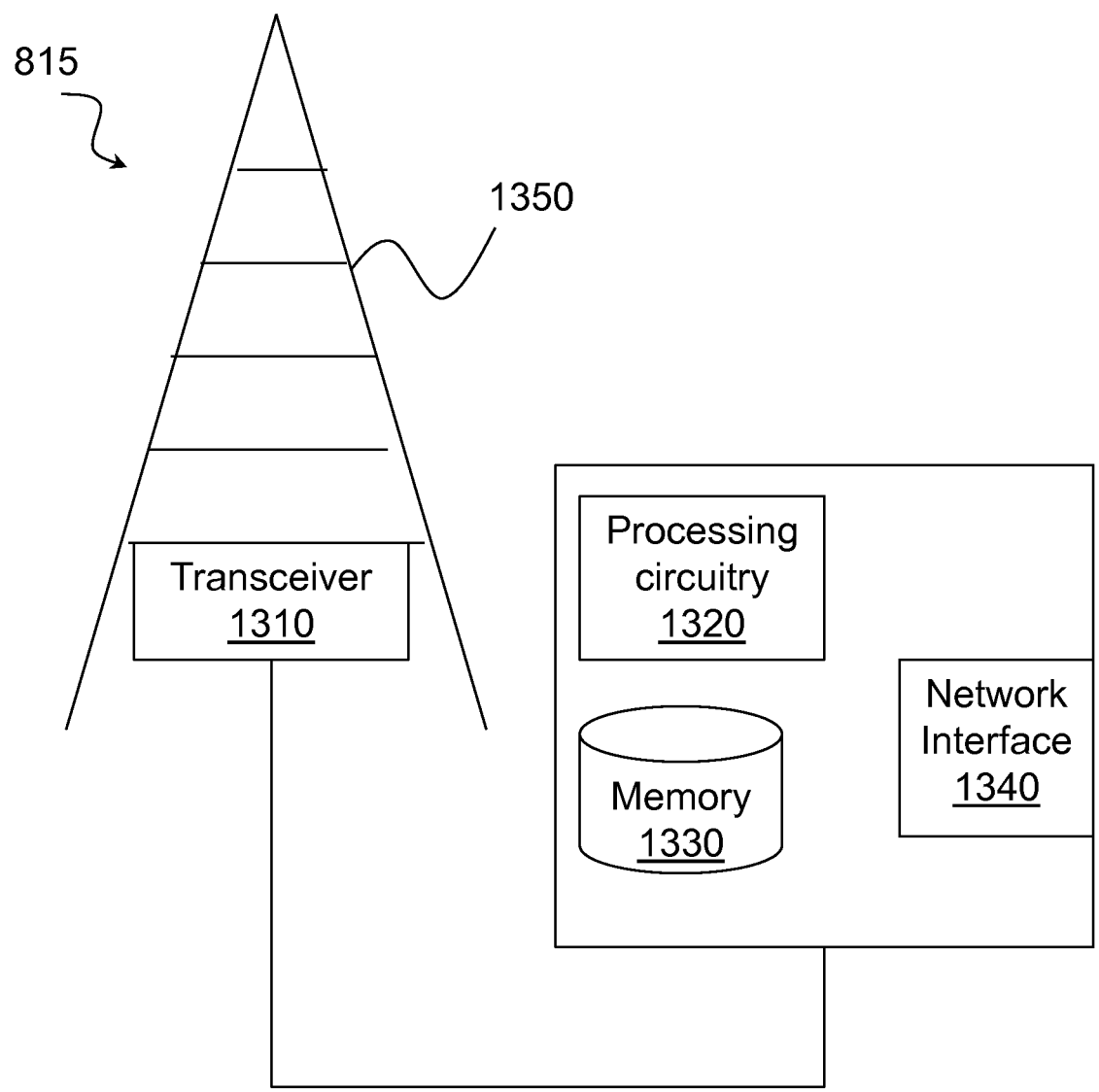
FIG. 20 illustrate an example network node for minimizing performance impact from known signal distortions, according to certain embodiments.

FIG. 20 illustrate an example network node 815 for minimizing performance impact from known signal distortions, according to certain embodiments. As described above, network node 815 may be any type of radio network node or any network node that communicates with a wireless device and/or with another network node. Examples of a network node 815 are provided above.

Network nodes 815 may be deployed throughout network 800 as a homogenous deployment, heterogeneous deployment, or mixed deployment. A homogeneous deployment may generally describe a deployment made up of the same (or similar) type of network nodes 815 and/or similar coverage and cell sizes and inter-site distances. A heterogeneous deployment may generally describe deployments using a variety of types of network nodes 815 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 815 may include one or more of transceiver 1310, processing circuitry 1320, memory 1330, and network interface 1340. In some embodiments, transceiver 1310 facilitates transmitting wireless signals to and receiving wireless signals from wireless device 810 (e.g., via an antenna), processing circuitry 1320 executes instructions to provide some or all of the functionality described above as being provided by a network node 815, memory 1330 stores the instructions executed by processing circuitry 1320, and network interface 1340 communicates signals to backend network components, such as a gateway, switch, router, Internet, Public Switched Telephone Network (PSTN), core network nodes or radio network controllers, etc.

In certain embodiments, network node 815 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processing circuitry 1320 may include any suitable combination of hardware and software implemented in one or more modules to execute instructions and manipulate data to perform some or all of the described functions of network node 815. In some embodiments, processing circuitry 1320 may include, for example, one or more computers, one or more central processing units (CPUs), one or more microprocessors, one or more applications, and/or other logic.

Memory 1330 is generally operable to store instructions, such as a computer program, software, an application including one or more of logic, rules, algorithms, code, tables, etc. and/or other instructions capable of being executed by a processor. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1340 is communicatively coupled to processing circuitry 1320 and may refer to any suitable device operable to receive input for network node 815, send output from network node 815, perform suitable processing of the input or output or both, communicate to other devices, or any combination of the preceding. Network interface 1340 may include appropriate hardware (e.g., port, modem, network interface card, etc.) and software, including protocol conversion and data processing capabilities, to communicate through a network.

Other embodiments of network node 815 may include additional components beyond those shown in FIG. 20 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 21:
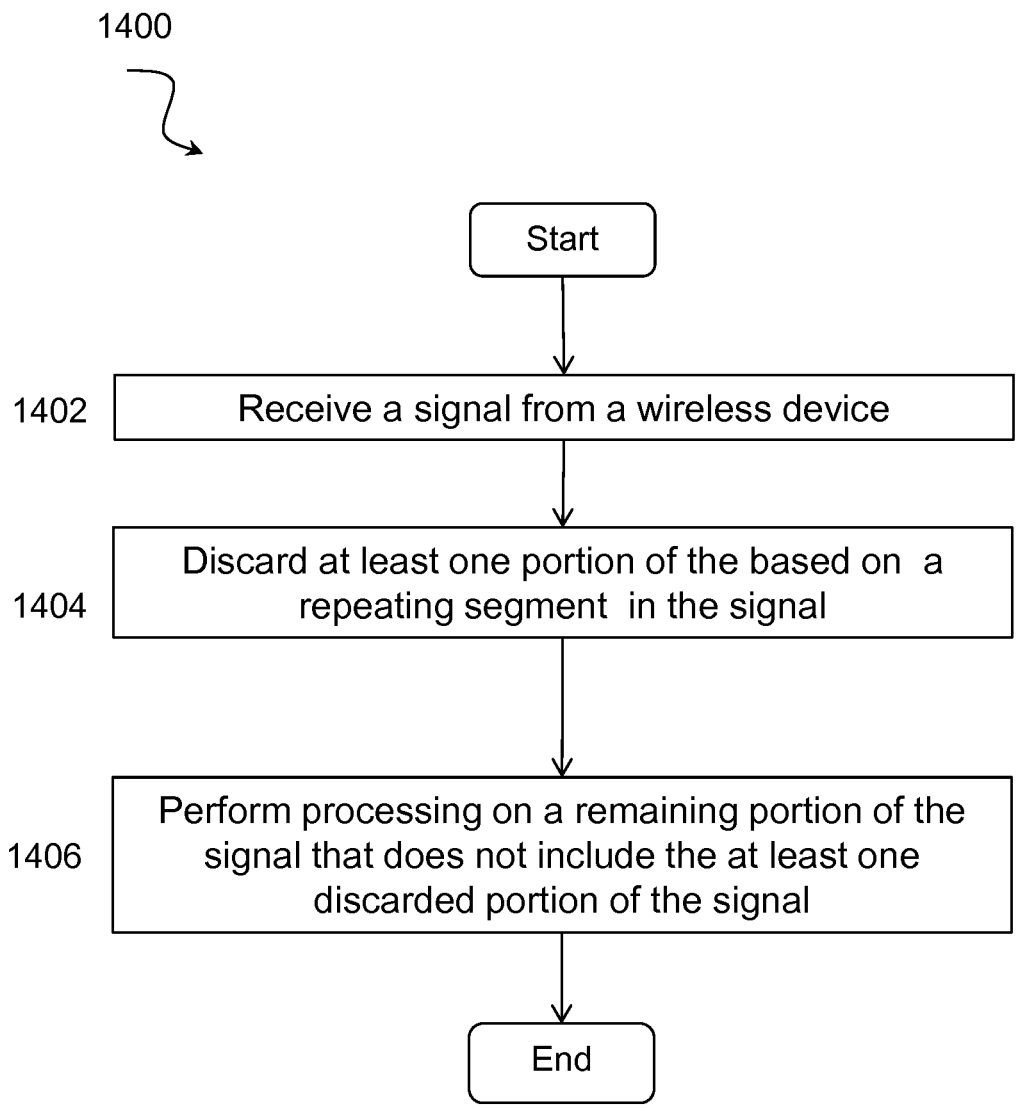
FIG. 21 illustrates an example method by a network node for minimizing performance impact from known signal distortions, according to certain embodiments.

FIG. 21 illustrates an example method 1400 for minimizing performance impact from known signal distortions, according to certain embodiments. The method begins at step 1402 when network node 815 receives a signal from a wireless device. In certain embodiments, the signal may be received in a short TTI. In certain embodiments, the signal may include a reference signal.

At step 1404, network node 815 discards at least one portion of the signal based on a repeating segment in the signal. In certain embodiments, the repeating segment may be repeated in time consecutive segments within a single symbol duration. Additionally, in certain embodiments, network node 815 may discard at least a portion of the signal based on a position and duration of known signal distortions in the at least one portion of the signal. In certain embodiments, network node 815 may discard the at least one portion of the signal to maintain orthogonality between the signal from the wireless device and at least one additional signal from at least one additional wireless device.

According to certain embodiments, the repeating segments be within a symbol and/or may be selected based on a duration of known signal distortions comprises an LTE transient period. In a particular embodiment, the transient period may be caused by an ON/OFF time mask of the wireless device. In various particular embodiments, the at least one portion comprises a plurality of repeated portions of the signal and discarding the at least one portion comprises discarding where the distortions are. In a particular embodiment, for example, if a repetition factor of two was used by wireless device 810, then network node 815 may discard half the signal.

At step 1406, network node 815 performs processing on a remaining portion of the signal that does not include the at least one discarded portion of the signal. In certain embodiments the processing may include synchronization, channel estimation, user separation, and/or reconstructing the full signal. In a particular embodiment, for example, the repeated portion may alter a frequency grid and an equalization process may take into account the altered frequency grid. In another particular embodiment, interpolation may be performed to arrive at a channel response reflecting a propagation channel of associated data symbols.

In certain embodiments, network node 815 may also transmit an assignment of reference signals to the wireless device before the signal is received from the wireless device. The assignment of reference signals may include the repetition factor for use in forming the plurality of repeated portions of the signal. In a particular embodiment, the assignment of reference signals may be transmitted by RRC signaling.

In certain embodiments, the at least one portion of the signal to be discarded may be selected based on a maximum known distortion. For example, if the maximum known distortion is lower than 1/M of the duration, a repetition factor N may be selected so that N is less than M.

Figure 22:
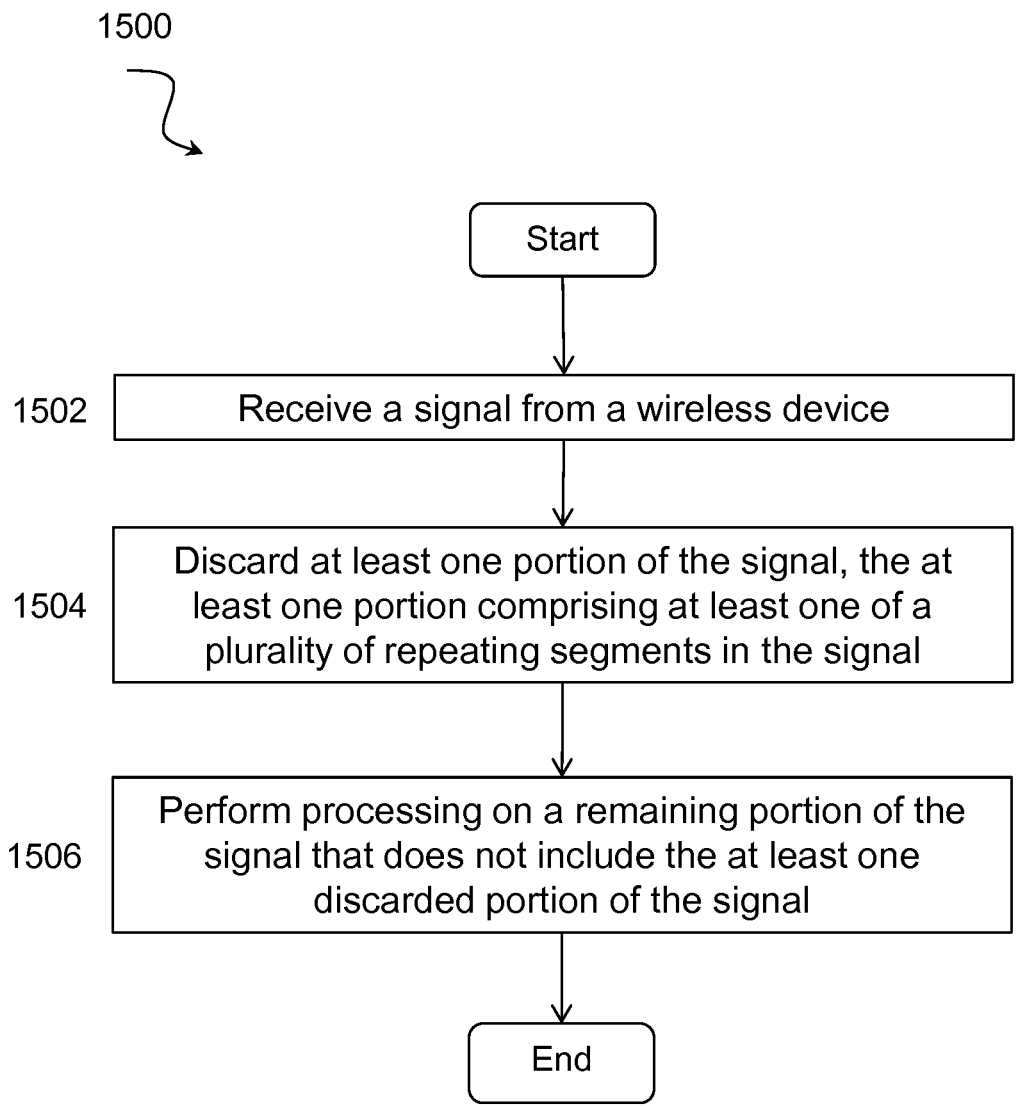
FIG. 22 illustrates another example method by a network node for minimizing performance impact from known signal distortions, according to certain embodiments.

FIG. 22 illustrates another example method 1500 for minimizing performance impact from known signal distortions, according to certain embodiments. The method begins at step 1502 when network node 815 receives a signal from a wireless device. In certain embodiments, the signal may be received in a subslot duration TTI. However, it is recognized that the described techniques are applicable to other possible TTIs such as a short TTI, a slot, or a mini-slot, as just some examples. In certain embodiments, the signal may include a reference signal.

At step 1504, network node 815 discards at least one portion of the signal. The discarded portion includes at least one of a plurality of repeating segments in the signal. In certain embodiments, the repeating segment may be repeated in time consecutive segments within a single symbol duration. In certain embodiments, network node 815 may discard the at least one portion of the signal to maintain orthogonality between the signal from the wireless device and at least one additional signal from at least one additional wireless device.

According to certain embodiments, the repeating segments may be repeated a number of times selected based on a known position and/or duration of at least one signal distortion. Thus, in certain embodiments, network node 815 may discard at least a portion of the signal based on the known position and/or duration of the at least one signal distortion. In a particular embodiment, the known position and/or duration of the at least one signal distortion may comprise an LTE transient period defined by an ON/OFF time mask of the wireless device. In another particular embodiment, the at least one portion of the signal to be discarded may be selected based on a maximum allowed distortion such that when the maximum allowed distortion is lower than 1/M of a symbol duration, the number of times the repeating segment is repeated is selected so that N is less than M.

In various particular embodiments, discarding the at least one repeating segment comprises discarding where the distortions are. In a particular embodiment, for example, if the signal includes two repeating segments network node 815 may discard half the signal. For example, network node 815 may discard every second duplication. In another embodiment, if the signal includes three repeating segments, network node 815 may discard one third of the signal. Thus, network node 815 may discard every third duplication. In still another example embodiment, if the signal includes four repeating segments, network node 815 may discard one fourth of the signal or every fourth duplication.

At step 1506, network node 815 performs processing on a remaining portion of the signal that does not include the at least one discarded portion of the signal. In certain embodiments the processing may include synchronization, channel estimation, user separation, and/or reconstructing the full signal. In a particular embodiment, for example, the repeated portion may alter a frequency grid and an equalization process may take into account the altered frequency grid. In another particular embodiment, interpolation may be performed to arrive at a channel response reflecting a propagation channel of associated data symbols.

In certain embodiments, network node 815 may also transmit an assignment of reference signals to the wireless device before the signal is received from the wireless device. The assignment of reference signals may include the repetition factor for use in forming the plurality of repeated portions of the signal. In a particular embodiment, the assignment of reference signals may be transmitted by RRC signaling.

Figure 23:
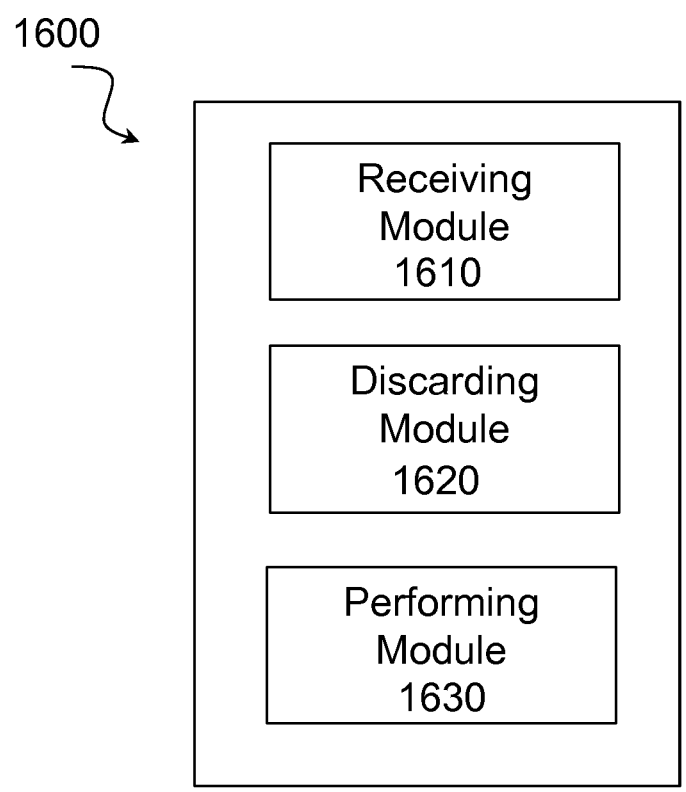
FIG. 23 illustrates another example virtual computing device for minimizing performance impact from known signal distortions, according to certain embodiments.

In certain embodiments, the method for minimizing performance impact from known signal distortions as described above may be performed by a computer networking virtual apparatus. FIG. 23 illustrates an example virtual computing device 1600 for minimizing performance impact from known signal distortions, according to certain embodiments. In certain embodiments, virtual computing device 1600 may include modules for performing steps similar to those described above with regard to the methods illustrated and described in FIGS. 21 and 22. For example, virtual computing device 1600 may include a receiving module 1610, a discarding module 1620, a performing module 1630, and any other suitable modules for minimizing performance impact from known signal distortions. In some embodiments, one or more of the modules may be implemented using one or more processing circuitry 1320 of FIG. 20. In certain embodiments, the functions of two or more of the various modules may be combined into a single module.

The receiving module 1610 may perform the receiving functions of virtual computing device 1600. For example, in a particular embodiment, receiving module 1610 may receive a signal from a wireless device.

The discarding module 1620 may perform the discarding functions of virtual computing device 1600. For example, in a particular embodiment, discarding module 1620 may discard at least one portion of the signal that includes at least one of a plurality of repeating segments in the signal. In certain embodiments, discarding module 1420 may discard the at least one portion of the signal to maintain orthogonality between the signal from the wireless device and at least one additional signal from at least one additional wireless device.

The performing module 1630 may perform the performing functions of virtual computing device 1600. For example, in a particular embodiment, performing module 1630 may perform processing on a remaining portion of the signal that does not include the at least one discarded portion of the signal. In certain embodiments the processing may include synchronization, channel estimation, user separation, and/or reconstructing the full signal.

Other embodiments of virtual computing device 1600 may include additional components beyond those shown in FIG. 23 that may be responsible for providing certain aspects of the network node's functionality, including any of the functionality described above and/or any additional functionality (including any functionality necessary to support the solutions described above). The various different types of network node 815 may include components having the same physical hardware but configured (e.g., via programming) to support different radio access technologies, or may represent partly or entirely different physical components.

Figure 24:
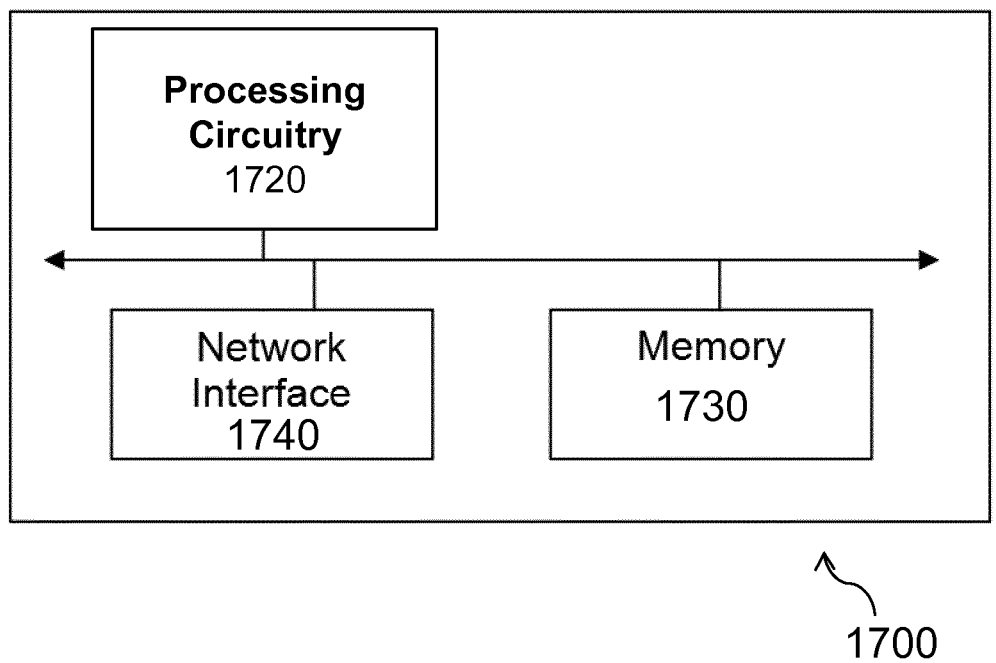
FIG. 24 illustrates an exemplary radio network controller or core network node, according to certain embodiments.

FIG. 24 illustrates an exemplary radio network controller or core network node 1700, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1700 include processor or processing circuitry 1720, memory 1730, and network interface 1740. In some embodiments, processor 1720 executes instructions to provide some or all of the functionality described above as being provided by the network node, memory 1730 stores the instructions executed by processor 1720, and network interface 1740 communicates signals to any suitable node, such as a gateway, switch, router, Internet, Public Switched Telephone Network (PSTN), network nodes 815, radio network controllers or core network nodes 1700, etc.

Processor 1720 may include any suitable combination of hardware and software implemented in one or more modules to execute instructions and manipulate data to perform some or all of the described functions of the radio network controller or core network node 1700. In some embodiments, processor 1720 may include, for example, one or more computers, one or more central processing units (CPUs), one or more microprocessors, one or more applications, and/or other logic.

Memory 1730 is generally operable to store instructions, such as a computer program, software, an application including one or more of logic, rules, algorithms, code, tables, etc. and/or other instructions capable of being executed by a processor. Examples of memory 1730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1740 is communicatively coupled to processor 1720 and may refer to any suitable device operable to receive input for the network node, send output from the network node, perform suitable processing of the input or output or both, communicate to other devices, or any combination of the preceding. Network interface 1740 may include appropriate hardware (e.g., port, modem, network interface card, etc.) and software, including protocol conversion and data processing capabilities, to communicate through a network.

Other embodiments of the network node may include additional components beyond those shown in FIG. 24 that may be responsible for providing certain aspects of the network node's functionality, including any of the functionality described above and/or any additional functionality (including any functionality necessary to support the solution described above).

According to certain embodiments, a method in a wireless device is provided for minimizing performance impact from known signal distortions. The method may include:
 determining a repetition factor from received signaling;
 based on the repetition factor, generating a signal comprising repeating segments for transmission to a network node;
 transmitting the signal comprising repeating segments to the network node;
 optionally, the repeating segments are within a symbol;
 optionally, the repetition factor is selected based on a position and/or duration of known signal distortions;
 optionally, the repetition factor is in addition to cyclic prefix;
 optionally, the signal is transmitted in a short transmission time interval (TTI);
 optionally, the signal comprises a reference signal;
 optionally, the duration of known signal distortions comprises an LTE transient period;
 optionally, the LTE transient period is caused by an ON/OFF time mask;
 optionally, the repeating segments are repeated in time consecutive segments, within a single symbol duration;
 optionally, the number of repeated segments is 2;
 optionally, the number of repeated segments is 3;
 optionally, the number of repeated segments is 4;
 optionally, the method further includes generating inputs to an Inverse Fourier Transform unit, wherein the outputs of the Inverse Fourier Transform unit comprise the repeating segments;
 optionally, all symbols of the inputs to the Inverse Fourier Transform unit are zeroed out except every second symbol;
 optionally, all symbols of the inputs to the Inverse Fourier Transform unit are zeroed out except every third symbol;
 optionally, all symbols of the inputs to the Inverse Fourier Transform unit are zeroed out except every fourth symbol;
 optionally, the zeroed out symbols result in the repeated segments;
 optionally, the Inverse Fourier Transform unit is reconfigured to produce a segment that is shorter than a full symbol;
 optionally, the received signaling comprises an assignment of reference signals from the network node, the assignment of reference signals comprising at least the repetition factor to for use in forming the plurality of repeated segments;
 optionally, the assignment of reference signals may comprise one or more interleaved frequency division multiple access (IFDMA) configurations to minimize performance impact of a transient period;
 optionally, the assignment of reference signals is received in RRC signaling;
 optionally, the repetition factor is selected based on a maximum known distortion;
 optionally, if the maximum known distortion is lower than 1/M of the duration, a repetition factor N is selected so that N is less than M;
 optionally, the at least repeating segment alters a frequency grid that alters an equalization process performed by the network node.

According to certain embodiments, a wireless device for minimizing performance impact from known signal distortions may include:
 processing circuitry, the processing circuitry configured to:
  determine a repetition factor from received signaling;
  based on the repetition factor, generate a signal comprising repeating segments for transmission to a network node;
  transmit the signal comprising repeating segments to the network node;
 optionally, the repeating segments are within a symbol;
 optionally, the repetition factor is selected based on a position and/or duration of known signal distortions;
 optionally, the repetition factor is in addition to cyclic prefix;
 optionally, the signal is transmitted in a short transmission time interval (TTI);
 optionally, the signal comprises a reference signal;
 optionally, the duration of known signal distortions comprises an LTE transient period;
 optionally, the LTE transient period is caused by an ON/OFF time mask;
 optionally, the repeating segments are repeated in time consecutive segments, within a single symbol duration;
 optionally, the method further includes generating inputs to an Inverse Fourier Transform unit, wherein the outputs of the Inverse Fourier Transform unit comprise the repeating segments;
 optionally, the number of repeated segments is 2;
 optionally, the number of repeated segments is 3;
 optionally, the number of repeated segments is 4;
 optionally, all symbols of the inputs to the Inverse Fourier Transform unit are zeroed out except every second symbol;
 optionally, all symbols of the inputs to the Inverse Fourier Transform unit are zeroed out except every third symbol;
 optionally, all symbols of the inputs to the Inverse Fourier Transform unit are zeroed out except every fourth symbol;
 optionally, the zeroed out symbols result in the repeated segments;
 optionally, the Inverse Fourier Transform unit is reconfigured to produce a segment that is shorter than a full symbol;
 optionally, the received signaling comprises an assignment of reference signals from the network node, the assignment of reference signals comprising at least the repetition factor to for use in forming the plurality of repeated segments;

optionally, the assignment of reference signals is received in RRC signaling;

optionally, the repetition factor is selected based on a maximum known distortion;

optionally, if the maximum known distortion is lower than 1/M of the duration, a repetition factor N is selected so that N is less than M;

optionally, the at least repeating segment alters a frequency grid that alters an equalization process performed by the network node.

According to certain embodiments, a method in a network node is provided for minimizing performance impact from known signal distortions. The method may include:

receiving a signal from a wireless device;

discarding at least one portion of the signal based on a repeating segment in the signal, wherein discarding the at least one portion of the signal maintains orthogonality between the signal from the wireless device and at least one additional signal from at least one additional wireless device;

performing processing on a remaining portion of the signal that does not include the at least one discarded portion of the signal;

optionally, performing processing comprises performing at least one of:

synchronization;

channel estimation;

user separation optionally, the repeating segments are within a symbol;

optionally, the repeating segments are selected based on a duration of known signal distortions comprises an LTE transient period;

optionally, the repeating segments are selected based on a position and/or duration of known signal distortions;

optionally, the duration of known signal distortions comprises an LTE transient period;

optionally, the LTE transient period is caused by an ON/OFF time mask of the wireless device;

optionally, the signal is received in a short transmission time interval (TTI);

optionally, the signal comprises a reference signal;

optionally, the repeating segments are repeated in time consecutive segments, within a single symbol duration;

optionally, discarding the at least one portion comprises discarding where the distortions occur;

optionally, where a repetition of two is used by the wireless device to generate the signal, the network node discards half the signal;

optionally, the method further comprises transmitting an assignment of reference signals to the wireless device, the assignment of reference signals comprising at least the repetition factor to the wireless device for use in forming the plurality of repeating segments of the signal;

optionally, the repetition factor is in addition to cyclic prefix;

optionally, the assignment of reference signals is transmitted by RRC signaling;

optionally, the method further comprises selecting the at least one portion of the signal to discard based on a maximum known distortion;

optionally, if the maximum known distortion is lower than 1/M of the duration, a repetition factor N is selected so that N is less than M;

optionally, performing processing on the remaining portion of the signal comprises reconstructing a full signal;

optionally, the at least one portion comprises at least one repeated portion that alters a frequency grid, and wherein the receiver performs an equalization process on a portion of the at least one signal that is not discarded, the equalization process taking into account the altered frequency grid;

optionally, performing processing comprises performing interpolation to arrive at a channel response reflecting a propagation channel of associated data symbols.

According to certain embodiments, a network node for minimizing performance impact from known signal distortions may include:

processing circuitry, the processing circuitry configured to:

receive a signal from a wireless device;

discard at least one portion of the signal based on a repeating segment in the signal, wherein discarding the at least one portion of the signal maintains orthogonality between the signal from the wireless device and at least one additional signal from at least one additional wireless device;

perform processing on a remaining portion of the signal that does not include the at least one discarded portion of the signal;

optionally, performing processing comprises performing at least one of:

synchronization;

channel estimation;

user separation optionally, the repeating segments are within a symbol;

optionally, the repeating segments are selected based on a duration of known signal distortions comprises an LTE transient period;

optionally, the repeating segments are selected based on a position and/or duration of known signal distortions;

optionally, the duration of known signal distortions comprises an LTE transient period;

optionally, the LTE transient period is caused by an ON/OFF time mask of the wireless device;

optionally, the signal is received in a short transmission time interval (TTI);

optionally, the signal comprises a reference signal;

optionally, the repeating segments are repeated in time consecutive segments, within a single symbol duration;

optionally, discarding the at least one portion comprises discarding where the distortions occur;

optionally, where a repetition of two is used by the wireless device to generate the signal, the network node discards half the signal;

optionally, the method further comprises transmitting an assignment of reference signals to the wireless device, the assignment of reference signals comprising at least the repetition factor to the wireless device for use in forming the plurality of repeating segments of the signal;

optionally, the repetition factor is in addition to cyclic prefix;

optionally, the assignment of reference signals is transmitted by RRC signaling;

optionally, the method further comprises selecting the at least one portion of the signal to discard based on a maximum known distortion;

optionally, if the maximum known distortion is lower than 1/M of the duration, a repetition factor N is selected so that N is less than M;

optionally, performing processing on the remaining portion of the signal comprises reconstructing a full signal;

optionally, the at least one portion comprises at least one repeated portion that alters a frequency grid, and wherein the receiver performs an equalization process on a portion of the at least one signal that is not discarded, the equalization process taking into account the altered frequency grid;

optionally, performing processing comprises performing interpolation to arrive at a channel response reflecting a propagation channel of associated data symbols.

Certain embodiments of the present disclosure may provide one or more technical advantages. For example, certain embodiments may improve performance in case the transmitted signal is distorted and it is known to the coordinating/receiving node where the signal distortions occur.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:

ABBREVIATION EXPLANATION

BBU Baseband Unit
BLER Block Error Rate
CFI Control Format Indicator
CRS Common Reference Symbols
CSI Channel State Information
DCI Downlink Control Information
DL Downlink
DFT Discrete Fourier Transform
DMRS Demodulation Reference Symbols
FDD Frequency Division Duplex
FDMA Frequency Division Multiple Access
FFT Fast Fourier Transform
FS Frame Structure
HARQ Hybrid Automatic Repeat Request
HTTP Hypertext Transfer Protocol
MAC Medium Access Control
MIB Master Information Block
OFDM Orthogonal Frequency Division Multiplexing
PMI Precoder Matrix Indicator
PUCCH Physical Uplink Control Channel
PUSCH Physical Uplink Shared Channel
RF Radio Frequency
RI Rank Indicator
RRU Remote Radio Unit
RRC Radio Resource Control
BBU Baseband Unit
BLER Block Error Rate
CFI Control Format Indicator
CRS Common Reference Symbols
CSI Channel State Information
DCI Downlink Control Information
DL Downlink
DFT Discrete Fourier Transform
DMRS Demodulation Reference Symbols
FDD Frequency Division Duplex
FDMA Frequency Division Multiple Access
FFT Fast Fourier Transform
FS Frame Structure
HARQ Hybrid Automatic Repeat Request
HTTP Hypertext Transfer Protocol
MAC Medium Access Control
MIB Master Information Block
OFDM Orthogonal Frequency Division Multiplexing
PMI Precoder Matrix Indicator
PUCCH Physical Uplink Control Channel
PUSCH Physical Uplink Shared Channel
RF Radio Frequency
RI Rank Indicator
RRU Remote Radio Unit
RRC Radio Resource Control

The invention claimed is:

1. A method in a wireless device comprises:
generating a signal comprising repeating segments for transmission in a subslot duration transmission time interval, TTI, to a network node; and
transmitting the signal comprising the repeating segments to the network node in the subslot duration TTI, and the repeating segments are repeated a number of times, N, the number of times selected based on at least one of a known position and duration of at least one signal distortion, the number of times, N, is selected being based on a maximum allowed duration of the at least one signal distortion, and when the maximum allowed duration of the at least one signal distortion is lower than 1/M of a symbol duration, the number of times, N, is selected to be less than M.

2. The method of claim 1, wherein the repeating segments are repeated in time consecutive segments within a symbol having the symbol duration.

3. The method of claim 1, wherein the at least one of the known position and duration of the at least one signal distortion comprises a Long-Term Evolution (LTE) transient period defined by an ON/OFF time mask.

4. The method of claim 1, further comprising generating inputs to an Inverse Fourier Transform unit, wherein zeroed out symbols in the inputs to the Inverse Fourier Transform unit result in outputs that comprise the repeating segments, wherein all symbols in the inputs are zeroed out except:
every second symbol resulting in two repeated segments;
every third symbol resulting in three repeated segments; or
every fourth symbol resulting in four repeated segments.

5. A wireless device comprising:
processing circuitry configured to:
generate a signal comprising repeating segments for transmission to a network node in a subslot duration transmission time interval, TTI; and
transmit the signal comprising the repeating segments to the network node in the subslot duration TTI, and the repeating segments are repeated a number of times, N, the number of times selected based on at least one of a known position and duration of at least one signal distortion, the number of times, N, is selected being based on a maximum allowed duration of the at least one signal distortion, and when the maximum allowed duration of the at least one signal distortion is lower than 1/M of a symbol duration, the number of times, N, is selected to be less than M.

6. The wireless device of claim 5, wherein the repeating segments are repeated in time consecutive segments within a symbol having a symbol duration.

7. The wireless device of claim 5, wherein the at least one of the known position and duration of the at least one signal distortion comprises a long-term evolution (LTE) transient period defined by an ON/OFF time mask.

8. The wireless device of claim 5, wherein a number of repeated segments is 2, 3, or 4.

9. The wireless device of claim 5, wherein the processing circuitry is configured to generate inputs to an Inverse Fourier Transform unit, wherein zeroed out symbols in the inputs to the Inverse Fourier Transform unit result in outputs that comprise the repeating segments, wherein all symbols in the inputs are zeroed out except:
every second symbol resulting in two repeated segments;
every third symbol resulting in three repeated segments; or
every fourth symbol resulting in four repeated segments.

10. A method in a network node, the method comprising:
receiving a signal from a wireless device; discarding at least one portion of the signal, the at least one portion comprising at least one of a plurality of repeating segments in the signal; and
performing processing on a remaining portion of the signal that does not include the at least one discarded portion of the signal, and the repeating segments are repeated a number of times, N, the number of times selected based on at least one of a known position and duration of at least one signal distortion, the number of times, N, is selected being based on a maximum allowed duration of the at least one signal distortion, and when the maximum allowed duration of the at least one signal distortion is lower than 1/M of a symbol duration, the number of times, N, is selected to be less than M.

11. A network node comprising: processing circuitry configured to:
receive a signal from a wireless device; discard at least one portion of the signal, the al least one portion comprising at least one of a plurality of repeating segments in the signal; and
perform processing on a remaining portion of the signal that does not include the al least one discarded portion of the signal, and the repeating segments are repeated a number of times, N, the number of times selected based on at least one of a known position and duration of at least one signal distortion, the at least one portion of the signal is selected to discard based on a maximum allowed distortion of the at least one signal distortion, and when the maximum allowed duration of the at least one signal distortion is lower than 1/M of a symbol duration, and a number of times, N, the repeating segments are repeated is selected so that N is less than M.

12. The network node of claim 11, wherein when performing processing the processing circuitry is configured to perform at least one of:
synchronization;
channel estimation;
user separation;
reconstruction of a full signal; and
interpolation to arrive at a channel response reflecting a propagation channel of associated data symbols.

13. The network node of claim 11, wherein the repeating segments are repeated in time consecutive segments within a symbol having the symbol duration.

14. The network node of claim 11, wherein the at least one of the known position and duration of the at least one signal distortion comprises a long-term evolution (LTE) transient period defined by an ON/OFF time mask.

15. The network node of claim 11, wherein the signal is received in a subslot duration transmission time interval, TTI.

16. The network node of claim 11, wherein:
when a repetition of two is used by the wireless device to generate the signal and the epeating segments comprise two duplicates of information, discarding the at least one portion of the signal comprises discarding half of the signal;
when a repetition of three is used by the wireless device to generate the signal and the repeating segments comprise three duplicates of the information, discarding the at least one portion of the signal comprises discarding one third of the signal; or
when a repetition of four is used by the wireless device to generate the signal and the repeating segments comprise four duplicates of the information, discarding the at least one portion of the signal comprises discarding one fourth of the signal.

17. The network node of claim 11, wherein the repeating segments comprise a plurality of duplications of information, and the processing circuitry is further configured to:
when the plurality of duplications comprise two repeated segments, discarding every second duplication;
when the plurality of duplications comprise three repeated segments, discarding every third duplication; or
when the plurality of duplications comprise four repeated segments, discarding every fourth duplication.

18. The network node claim 11, wherein the processing circuitry is further configured to transmit an assignment of reference signals to the wireless device, the assignment of the reference signals indicating a number of times to repeat the repeating segments in the signal.

19. The network node of claim 18, wherein the assignment of the reference signals is transmitted by Radio Resource Control (RRC) signaling.

20. The network node of claim 11, wherein the at least one portion comprises at least one repeated portion that alters a frequency grid, and wherein the processing circuitry performs an equalization process on the remaining portion of the signal that is not discarded, the equalization process taking into account the altered frequency grid.

* * * * *